US009246776B2

(12) United States Patent
Ellsworth et al.

(10) Patent No.: US 9,246,776 B2
(45) Date of Patent: *Jan. 26, 2016

(54) FORWARD-BASED RESOURCE DELIVERY NETWORK MANAGEMENT TECHNIQUES

(71) Applicant: Amazon Technologies, Inc., Seattle, WA (US)

(72) Inventors: Joseph L. Ellsworth, Bainbridge Island, WA (US); Brandon William Porter, Auburn, WA (US); Christopher Allen Suver, Seattle, WA (US); Christopher Richard Newcombe, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/644,031

(22) Filed: Mar. 10, 2015

(65) Prior Publication Data

US 2015/0249579 A1 Sep. 3, 2015

Related U.S. Application Data

(63) Continuation of application No. 13/842,970, filed on Mar. 15, 2013, which is a continuation of application No. 12/652,541, filed on Jan. 5, 2010, now Pat. No. 8,433,771.

(60) Provisional application No. 61/248,291, filed on Oct. 2, 2009.

(51) Int. Cl.
*H04L 12/24* (2006.01)
*H04N 21/2225* (2011.01)
(Continued)

(52) U.S. Cl.
CPC ...... *H04L 41/5025* (2013.01); *G06F 17/30091* (2013.01); *H04L 47/782* (2013.01); *H04L 67/125* (2013.01); *H04N 21/2225* (2013.01); *H04N 21/23103* (2013.01)

(58) Field of Classification Search
CPC . H04L 67/125; H04L 47/782; H04L 41/5025; H04N 21/2225; H04N 21/23103; G06F 17/30091
USPC ......................................................... 709/213
See application file for complete search history.

(56) References Cited

U.S. PATENT DOCUMENTS 5,341,477 A 8/1994 Pitkin et al.
5,611,049 A 3/1997 Pitts
(Continued)

FOREIGN PATENT DOCUMENTS

CA 2741 895 A1 5/2010
CN 1422468 A 6/2003
(Continued)

OTHER PUBLICATIONS

Horvath et al., "Enhancing Energy Efficiency in Multi-tier Web Server Clusters via Prioritization," in Parallel and Distributed Processing Symposium, 2007. IPDPS 2007. IEEE International , vol., no., pp. 1-6, Mar. 26-30, 2007.*
(Continued)

*Primary Examiner* — Kostas Katsikis
(74) *Attorney, Agent, or Firm* — Knobbe Martens Olson & Bear LLP

(57) ABSTRACT

A resource delivery network and method for distributing content in the network is disclosed herein. The network comprises a plurality of servers arranged in tiers and partitioned. Each server includes a resource store with a set of resources for distribution to a successive tier. Updates to each successive tier are provided by a pull-forward client on servers in the tier. This forward propagation mechanism maximizes resource availability at edge servers in the network. Resources transmitted to the edge tier servers may be transformed, combined, and rendered without taxing lower tier servers. Transformation and pre-rendering of data can be performed by low priority CPU tasks at each layer of the system.

16 Claims, 10 Drawing Sheets

(51) Int. Cl.
*H04N 21/231* (2011.01)
*H04L 29/08* (2006.01)
*G06F 17/30* (2006.01)
*H04L 12/911* (2013.01)

(56) References Cited

U.S. PATENT DOCUMENTS

| | | |
|---|---|---|
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,078,960 A | 6/2000 | Ballard |
| 6,085,234 A | 7/2000 | Pitts et al. |
| 6,098,096 A | 8/2000 | Tsirigotis et al. |
| 6,108,703 A | 8/2000 | Leighton et al. |
| 6,157,942 A | 12/2000 | Chu et al. |
| 6,167,438 A | 12/2000 | Yates et al. |
| 6,167,446 A | 12/2000 | Lister et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,643,357 B2 | 11/2003 | Lumsden |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,874,017 B1 | 3/2005 | Inoue et al. |
| 6,917,951 B2 | 7/2005 | Orbits et al. |
| 6,928,467 B2 | 8/2005 | Peng |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,289,519 B1 | 10/2007 | Liskov |
| 7,293,093 B2 | 11/2007 | Leighton et al. |
| 7,308,499 B2 | 12/2007 | Chavez |
| 7,310,686 B2 | 12/2007 | Uysal |
| 7,316,648 B2 | 1/2008 | Kelly et al. |

(56) References Cited

U.S. PATENT DOCUMENTS

| | | | |
|---|---|---|---|
| 7,320,131 B1 | 1/2008 | O'Toole, Jr. |
| 7,321,918 B2 | 1/2008 | Burd et al. |
| 7,339,937 B2 | 3/2008 | Mitra et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,430,610 B2 | 9/2008 | Pace et al. |
| 7,441,045 B2 | 10/2008 | Skene et al. |
| 7,441,261 B2 * | 10/2008 | Slater ............... H04L 29/06027 348/E5.008 |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,685,251 B2 | 3/2010 | Houlihan et al. |
| 7,693,813 B1 | 4/2010 | Cao et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | Van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,010,707 B2 | 8/2011 | Elzur et al. |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,135,820 B2 | 3/2012 | Richardson et al. |
| 8,156,243 B2 | 4/2012 | Richardson et al. |
| 8,190,682 B2 | 5/2012 | Paterson-Jones et al. |
| 8,195,837 B2 | 6/2012 | McCarthy et al. |
| 8,224,986 B1 | 7/2012 | Liskov et al. |
| 8,234,403 B2 | 7/2012 | Richardson et al. |
| 8,239,530 B2 | 8/2012 | Sundaram et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,908 B2 | 8/2013 | Holmes et al. |
| 8,526,405 B2 | 9/2013 | Curtis et al. |
| 8,527,658 B2 | 9/2013 | Holmes et al. |

(56) References Cited

U.S. PATENT DOCUMENTS

| | | |
|---|---|---|
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,615,549 B2 | 12/2013 | Knowles et al. |
| 8,626,950 B1 | 1/2014 | Maccarthaigh et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,732,309 B1 | 5/2014 | Richardson et al. |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 | 2/2015 | Shah |
| 9,003,035 B1 | 4/2015 | Richardson et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,083,675 B2 | 7/2015 | Richardson et al. |
| 9,083,743 B1 | 7/2015 | Patel et al. |
| 9,106,701 B2 | 8/2015 | Richardson et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1* | 12/2002 | Wang ............... H04L 29/06 709/226 |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1* | 12/2003 | Dilley ............... H04L 29/06 709/214 |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010563 A1 | 1/2004 | Forte et al. |
| 2004/0010588 A1* | 1/2004 | Slater ............... H04L 29/06027 709/224 |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |

(56) References Cited

U.S. PATENT DOCUMENTS

| | | |
|---|---|---|
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0168088 A1 | 7/2006 | Leighton et al. |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |

(56) References Cited

U.S. PATENT DOCUMENTS

| | | |
|---|---|---|
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1* | 6/2008 | Hardin ............... H04N 7/17336 709/218 |
| 2008/0155061 A1 | 6/2008 | Afergan et al. |
| 2008/0155613 A1* | 6/2008 | Benya ................ H04N 7/17318 725/89 |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0274765 A1 | 10/2010 | Murphy et al. |
| 2010/0293296 A1 | 11/2010 | Hsu et al. |

(56) References Cited

U.S. PATENT DOCUMENTS

| | | |
|---|---|---|
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0055714 A1 | 3/2011 | Vemulapalli et al. |
| 2011/0058675 A1* | 3/2011 | Brueck ............ H04N 21/2541 380/277 |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0036238 A1 | 2/2012 | Sundaram et al. |
| 2012/0066360 A1 | 3/2012 | Ghosh |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0166516 A1 | 6/2012 | Simmons et al. |
| 2012/0169646 A1 | 7/2012 | Berkes et al. |
| 2012/0173677 A1 | 7/2012 | Richardson et al. |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303785 A1 | 11/2012 | Sivasubramanian et al. |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1 | 1/2013 | Trahan et al. |
| 2013/0007101 A1 | 1/2013 | Trahan et al. |
| 2013/0007102 A1 | 1/2013 | Trahan et al. |
| 2013/0007241 A1 | 1/2013 | Trahan et al. |
| 2013/0019311 A1 | 1/2013 | Swildens et al. |
| 2013/0041872 A1 | 2/2013 | Aizman et al. |
| 2013/0046869 A1 | 2/2013 | Jenkins et al. |
| 2013/0080420 A1 | 3/2013 | Taylor et al. |
| 2013/0080421 A1 | 3/2013 | Taylor et al. |
| 2013/0080576 A1 | 3/2013 | Taylor et al. |
| 2013/0080577 A1 | 3/2013 | Taylor et al. |
| 2013/0086001 A1 | 4/2013 | Bhogal et al. |
| 2013/0117849 A1 | 5/2013 | Golshan et al. |
| 2013/0130221 A1 | 5/2013 | Kortemeyer et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0305046 A1 | 11/2013 | Mankovski et al. |
| 2013/0311605 A1 | 11/2013 | Richardson et al. |
| 2013/0339429 A1 | 12/2013 | Richardson et al. |
| 2013/0346567 A1 | 12/2013 | Richardson et al. |
| 2014/0040478 A1 | 2/2014 | Hsu et al. |
| 2014/0053022 A1 | 2/2014 | Forgette et al. |
| 2014/0059198 A1 | 2/2014 | Richardson et al. |
| 2014/0075109 A1 | 3/2014 | Richardson et al. |
| 2014/0143320 A1 | 5/2014 | Sivasubramanian et al. |
| 2014/0257891 A1 | 9/2014 | Richardson et al. |
| 2014/0297870 A1 | 10/2014 | Eggleston et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188994 A1 | 7/2015 | Marshall et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |

FOREIGN PATENT DOCUMENTS

| | | |
|---|---|---|
| CN | 1605182 A | 4/2005 |
| CN | 101189598 A | 5/2008 |
| CN | 101460907 A | 6/2009 |
| CN | 103731481 A | 4/2014 |
| EP | 1603307 | 12/2005 |
| EP | 1351141 | 10/2007 |
| EP | 2008167 A2 | 12/2008 |
| JP | 2001-0506093 | 5/2001 |
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-209623 | 10/2012 |
| WO | WO 02/069608 A2 | 9/2002 |
| WO | 2005/071560 | 8/2005 |
| WO | WO 2007/007960 A1 | 1/2007 |
| WO | WO 2007/126837 A2 | 11/2007 |
| WO | WO 2009/124006 A2 | 10/2009 |
| WO | WO 2010/002603 A1 | 1/2010 |
| WO | WO 2012/044587 | 4/2012 |

OTHER PUBLICATIONS

Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.

(56) References Cited

OTHER PUBLICATIONS

"Scaleable Trust of Next Generation Management (STRONG-MAN)," retrieved May 17, 2006, from http://www.cis.upenn.edu/~dsl/STRONGMAN/, 4 pages.

"Sun EDA Compute Ranch," Sun Microsystems, Inc., retrieved May 3, 2006, from http://sun.com/processors/ranch/brochure.pdf, 2 pages.

"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.

"Sun N1 Grid Engine 6," Sun Microsystems, Inc., retrieved May 3, 2006, from http://www.sun.com/software/gridware/index.xml, 3 pages.

"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.

"The Softricity Desktop," Softricity, Inc., retrieved May 3, 2006, from http://www.softricity.com/products/, 3 pages.

"Xen—The Xen virtual Machine Monitor," University of Cambridge Computer Laboratory, retrieved Nov. 8, 2005, from http://www.cl.cam.ac.uk/Research/SRG/netos/xen/, 2 pages.

"XenFaq," retrieved Nov. 8, 2005, from http://wiki.xensource.com/xenwiki/XenFaq?action=print, 9 pages.

Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.

American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.

Baglioni et al., "Preprocessing and Mining Web Log Data for Web Personalization", LNAI 2829, 2003, pp. 237-249.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

Bellovin, S., "Distributed Firewalls," ;login;:37-39, Nov. 1999, http://www.cs.columbia.edu/-smb/papers/distfw. html, 10 pages, retrieved Nov. 11, 2005.

Blaze, M., "Using the KeyNote Trust Management System," Mar. 1, 2001, from http://www.crypto.com/trustmgt/kn.html, 4 pages, retrieved May 17, 2006.

Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.

Byun et al., "A Dynamic Grid Services Deployment Mechanism for On-Demand Resource Provisioning", IEEE International Symposium on Cluster Computing and the Grid:863-870, 2005.

Chipara et al, "Realtime Power-Aware Routing in Sensor Network", IEEE, 2006, 10 pages.

Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

Gruener, J., "A Vision of Togetherness," May 24, 2004, NetworkWorld, retrieved May 3, 2006, from, http://www.networkworld.com/supp/2004/ndc3/0524virt.html, 9 pages.

Gunther et al, "Measuring Round Trip Times to determine the Distance between WLAN Nodes",May 2005, In Proc. of Networking 2005, all pages.

Gunther et al, "Measuring Round Trip Times to determine the Distance between WLAN Nodes", Dec. 18, 2004, Technical University Berlin, all pages.

Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/dt.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.

Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123.

Liu et al., "Combined mining of Web server logs and web contents for classifying user navigation patterns and predicting users' future requests," Data & Knowledge Engineering 61 (2007) pp. 304-330.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.

Virtual Iron Software Home, Virtual Iron, retrieved May 3, 2006, from http://www.virtualiron.com/, 1 page.

Waldspurger, CA., "Spawn: A Distributed Computational Economy," Feb. 1992, IEEE Transactions on Software Engineering, 18(2): 103-117, 15 pages.

(56) References Cited

OTHER PUBLICATIONS

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, mailed Oct. 12, 2011 in 11 pages.
Supplementary European Search Report in Application No. 09727694.3 mailed Jan. 30, 2012 in 6 pages.
Singapore Examination Report in Application No. 201006837-7 mailed Mar. 16, 2012.
First Office Action in Chinese Application No. 200980111426.1 mailed Feb. 16, 2013.
Second Office Action in Chinese Application No. 200980111426.1 mailed Dec. 25, 2013.
Third Office Action in Chinese Application No. 200980111426.1 mailed Jul. 7, 2014.
Fourth Office Action in Chinese Application No. 200980111426.1 mailed Jan. 15, 2015.
First Office Action in Japanese Application No. 2011-502139 dated Nov. 5, 2013.
Decision of Rejection in Application No. 2011-502139 dated Jun. 30, 2014.
Singapore Written Opinion in Application No. 201006874-0, mailed Oct. 12, 2011 in 10 pages.
First Office Action in Japanese Application No. 2011-502140 mailed Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report for European Application No. 09839809.2 dated May 11, 2015.
Supplementary European Search Report in Application No. 09728756.9 mailed Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 mailed on Oct. 12, 2011.
First Office Action is Chinese Application No. 200980125551.8 mailed Jul. 4, 2012.
First Office Action in Japanese Application No. 2011-516466 mailed Mar. 6, 2013.
Second Office Action in Japanese Application No. 2011-516466 mailed Mar. 17, 2014.
Decision of Refusal in Japanese Application No. 2011-516466 mailed Jan. 16, 2015.
Office Action in Canadian Application No. 2726915 dated May 13, 2013.
First Office Action in Korean Application No. 10-2011-7002461 mailed May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Search Report and Written Opinion in Singapore Application No. 201103333-9 mailed Nov. 19, 2012.
Examination Report in Singapore Application No. 201103333-9 dated Aug. 13, 2013.
International Search Report and Written Opinion in PCT/US2011/053302 mailed Nov. 28, 2011 in 11 pages.
International Preliminary Report on Patentability in PCT/US2011/053302 mailed Apr. 2, 2013.
First Office Action in Japanese Application No. 2013-529454 mailed Feb. 3, 2014 in 6 pages.
Office Action in Japanese Application No. 2013-529454 mailed Mar. 9, 2015 in 8 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
First Office Action in Chinese Application No. 201180046104.0 mailed Nov. 3, 2014.
Examination Report in Singapore Application No. 201301573-0 mailed Dec. 22, 2014.
International Preliminary Report on Patentability in PCT/US2011/061486 mailed May 22, 2013.
International Search Report and Written Opinion in PCT/US2011/061486 mailed Mar. 30, 2012 in 11 pages.
First Office Action in Chinese Application No. 201180053405.6 dated May 3, 2015.
Office Action in Japanese Application No. 2013-540982 dated Jun. 2, 2014.
Written Opinion in Singapore Application No. 201303521-7 dated May 20, 2014.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 mailed Dec. 11, 2012 in 26 pages.
Office Action in Japanese Application No. 2013-123086 mailed Apr. 15, 2014 in 3 pages.
Office Action in Japanese Application No. 2013-123086 mailed Dec. 2, 2014 in 2 pages.
"Final Office Action dated Sep. 5, 2012", U.S. Appl. No. 12/652,541 (40 pages).
"Non Final Office Action dated Jan. 3, 2012", U.S. Appl. No. 12/652,541 (35 pages).
"Notice of Allowance dated Jan. 4, 2013", U.S. Appl. No. 12/652,541 (11 pages).

(56) References Cited

OTHER PUBLICATIONS

"Non Final Office Action dated Apr. 30, 2014", U.S. Appl. No. 13/842,970 (20 pages).
"Final Office Action dated Aug. 19, 2014", U.S. Appl. No. 13/842,970 (13 pages).
"Notice of Allowance dated Dec. 5, 2014", U.S. Appl. No. 13/842,970 (6 pages).

Armour et al.: "A Heuristic Algorithm and Simulation Approach to Relative Location of Facilities"; Management Science, vol. 9, No. 2 (Jan. 1963); pp. 294-309.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.

* cited by examiner

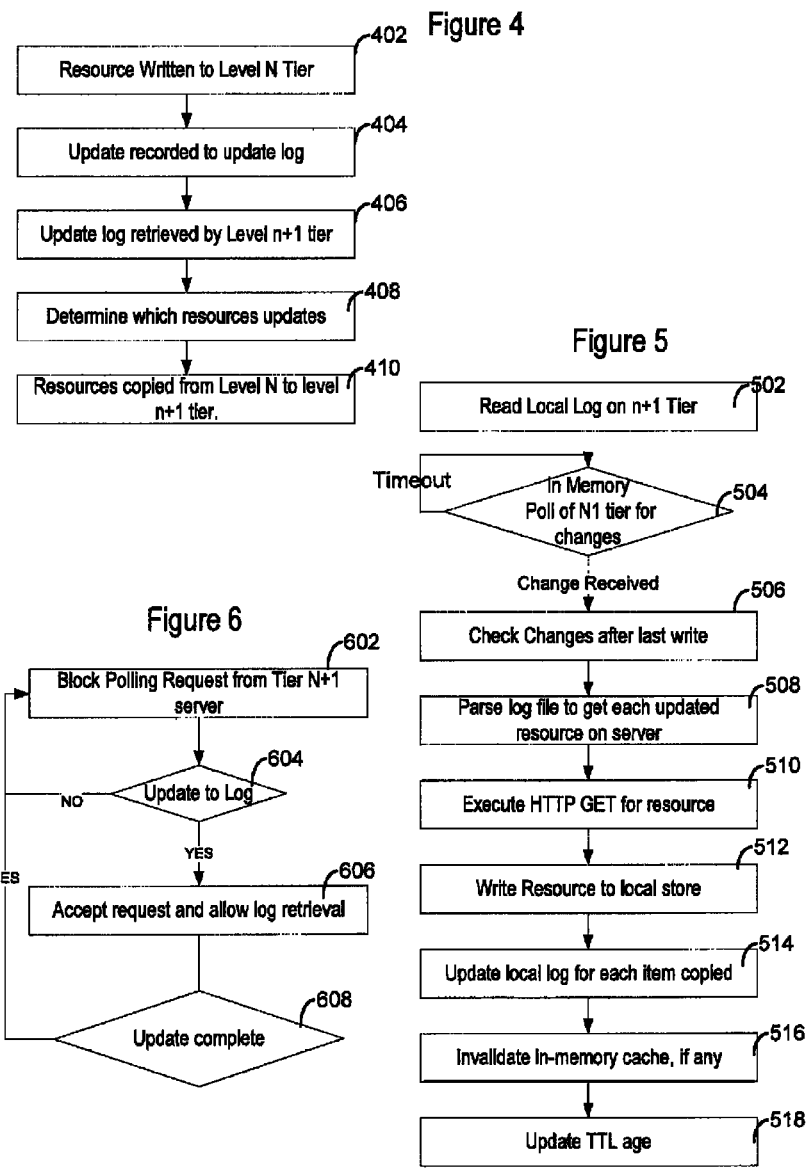

Figure 8

```
ws1,22, 20090131102136555555,W,/joemerchant/joesite/web/joe.layout.xml.1
ws1,23, 20090131102136555558,W,/joemerchant/joesite/web/joe.detail.layout.xml.1
ws1,24, 20090131102136555560,W,/server/items/00019919/baseitem.ion
ws1,25, 20090131102136555562,W,/server/items/00019919/offers.ion
ws1,26, 20090131102136555568,W,/server/items/00019919/baseitem.ion
ws1,28, 20090131102136555588,W,/server/items/00019919/bestoffer.ion
```

(12) United States Patent
US 9,246,776 B2

FORWARD-BASED RESOURCE DELIVERY NETWORK MANAGEMENT TECHNIQUES

CROSS-REFERENCE TO RELATED APPLICATIONS

This application is a continuation of U.S. application Ser. No. 13/842,970, entitled "FORWARD-BASED RESOURCE DELIVERY NETWORK," filed Mar. 15, 2013, which is a continuation of allowed U.S. application Ser. No. 12/652,541, entitled "DISTRIBUTION NETWORK WITH FORWARD RESOURCE PROPAGATION," filed Jan. 5, 2010, and issuing as U.S. Pat. No. 8,667,088, each of which is incorporated by reference herein for all purposes.

BACKGROUND

Large scale service providers providing data, content and applications via the Internet look to maximize availability and responsiveness of clustered server systems. They also seek to maintain minimal total costs of ownership for their systems. As more users access such information, demand for faster delivery and responsiveness increases.

Delivery systems have been developed whereby geographically dispersed networks of edge locations can each store copies of content. Each edge location can include one or multiple servers. Clients requesting the content are routed to the nearest edge location so the content is delivered with the best possible performance. To achieve the best possible performance, the edge locations are typically high performance data centers that are able to respond to requested loads during peak times.

The primary issue with this strategy is that the edge locations or "caches" need to manage freshness or validity of their content. Edge locations expire the content and refresh it on a relatively frequent basis. The requirement for freshness creates cache misses which may end up invoking back end services at a higher cost. In some cases the content has expired based on a time-to-live (TTL) value, but the content may not actually have changed. In many systems, there is no mechanism to refresh the edge cache without executing the full heavyweight retrieval from the back end service. This results in a large amount of network traffic and back end service calls which yield no benefit to the service provider or end user. In current multi-tier cache systems, it may be difficult to ensure content freshness without forcing every caching layer have shorter than desired TTL values. The cost of a refresh includes the cost of a proxy cache miss at every cache layer and back end server processing.

BRIEF DESCRIPTION OF THE DRAWINGS

FIG. 4 illustrates a method of updating content at various tiers or tiers of servers within the system of FIGS. 1-3.

FIG. 5 illustrates a process running on a client tier in accordance with the present technology.

FIG. 6 illustrates a process running on a server tier in accordance with the present technology.

FIG. 8 illustrates an exemplary portion of a change log used in the present technology.

DESCRIPTION

Technology is presented which uses a forward propagation mechanism in a resource delivery network to maximize resource availability at edge locations in the network. The technology retains cache semantics for look asides on read misses at the edge locations. Multiple layers of cache are kept fresh using pull-based forward propagation. The technology provides transparent support for multiple tiers of systems, allowing the technology to scale to support very large read loads while presenting fresh data at a lower total cost. Additional background CPU tasks at each cache layer may be used for partial pre-rendering of data, which increases effective machine utilization. The technology also eliminates cache miss storms which can brownout back end services.

The technology will be described herein using a document-centric discussion. In this context, a resource may be considered as a file. However, a resource may represent an element not stored in a file such as a database or other service. A resource may also be interpreted as an arbitrary blob of data which can be stored in an arbitrarily extensible hierarchal storage mechanism and the term subdirectory is interpreted as a group which may contain resources or other groups. The technology does not require an underlying file system. Resources are uniquely identified with a uniform resource identifier (URI) semantic and change history is recorded for each resource.

In addition, while resources are often described herein as written or copied to different systems. It should be recognized that resources may be stored in volatile memory of systems or in alternative forms or non-volatile memory such as hard-disks, disc arrays, solid state systems or other forms of non-volatile memory. The technology allows misses against memory to reference disk while retaining overall high system performance.

Figure 1:
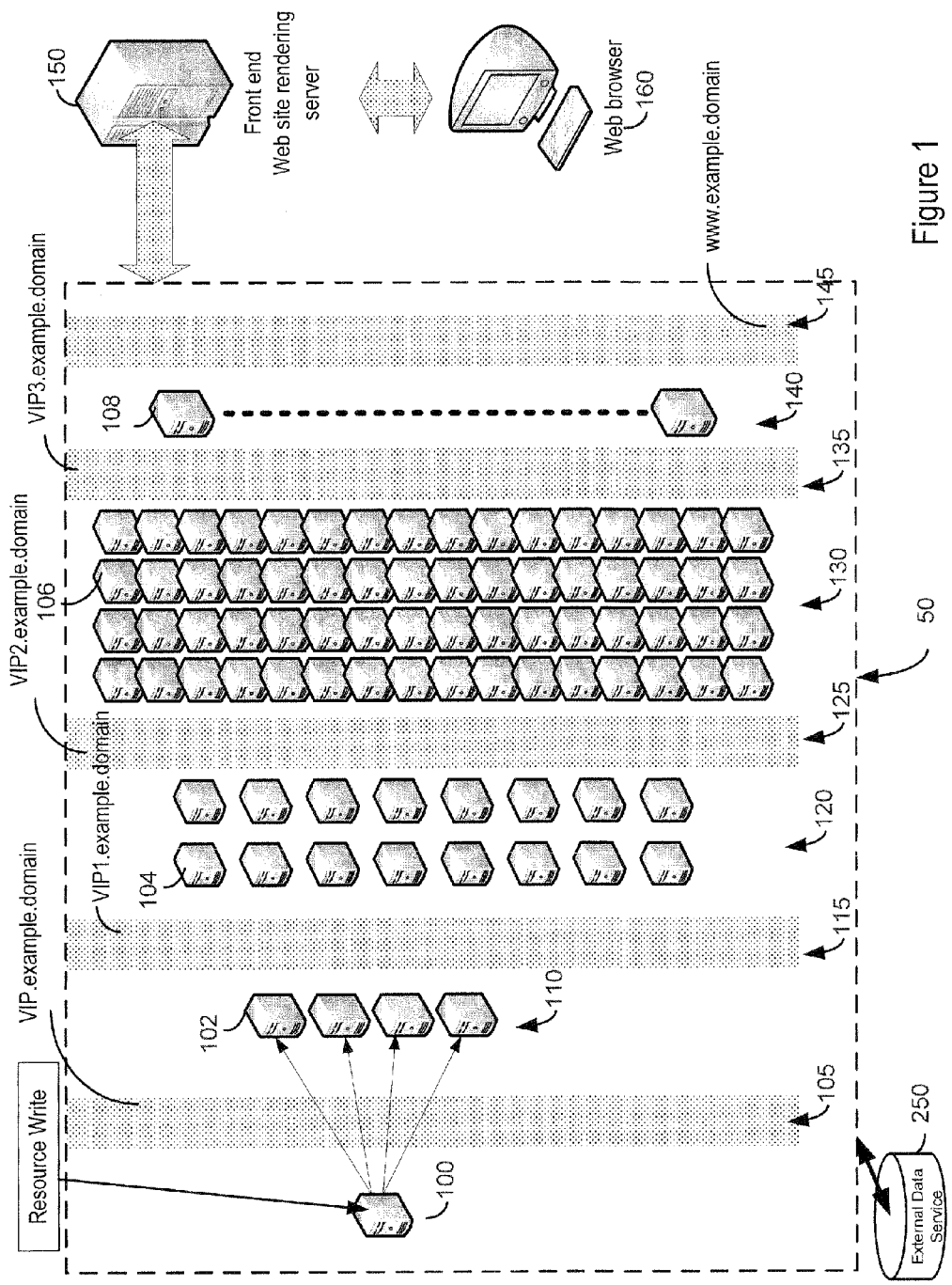
FIG. 1 is a depiction of an exemplary processing environment for implementing the technology.

FIG. 1 illustrates an exemplary processing environment for implementing the technology. FIG. 1 illustrates a clustered delivery network system 50 comprising set of vertically partitioned servers or server clusters 100, 110, 120, 130, 140. At the highest tier of the vertical partition is an authoritative store 100, also referred to herein as an authoritative server. The authoritative store 100 may comprise a set of 1 or more servers in a cluster. The primary characteristic of an authoritative store 100 is that that it acts as the authoritative entity for a group of data. In this capacity, all data stored on the authoritative store is replicated to each of the servers 110, 120, 130, 140 in each of the tiers below the store 100. The amount and scope of data will vary and it may be partitioned in various ways as described below. In one embodiment, each tier 110, 120, 130, 140 away from the authoritative store 100 comprises an increasing number of servers.

Each tier 110, 120, 130, 140 includes one or more caching servers 102, 104, 106, 108 which are used to scale the system.

Servers in, for example, tier 110 pull resources written to authoritative store 100. Servers in tiers 110, 120, 130, 140 pull resources from the next higher tier of servers. Cache servers in tiers 110, 120, 130 and additional tiers all use the same resource synchronization mechanism.

Within the architecture, routers (illustrated in FIG. 3) may be used to direct traffic between the servers and server layers. Each set of VIP addresses 105, 115, 125, 135 in the architecture and each partition may be assigned different domain entries and sub-domains to allow traffic routing using standard DNS and TCP/IP protocol techniques.

A set of all resources is stored on the authoritative store 100. Writes are made for resources to the authoritative server by means of a PUT or POST command using standard HTTP protocol. As noted above, while HTTP protocol may be used in one embodiment, alternative protocols other than HTTP may be utilized. Any a protocol which allows long lived connections with a bi-directional conversation could be utilized. In still another alternative, a mix of protocols may be used in the same system. In accordance with the technology, each resource written to the authoritative store is copied down each tier until it reaches the edge tier servers (tier 140 in FIG. 1). Read requests from, for example, users operating web browsers 160 are addressed by a web-site rendering server 150, and resource requests from the web-site rendering server 150 are served by the edge tier of servers 140. In the example shown in FIG. 1, all web servers address the domain www.example.domain 145. Requests to the domain are then routed to the edge tier servers 140 using conventional techniques. As noted above, an authoritative store may not be a simple HTTP resource server but may be a system such as a relational database or another service providing system. Any lower level misses that make it through all the layers to this system will incur the full load of hitting the underlying service or device.

Each tier 110, 120, 130, 140 replicates files on the authoritative store 100 using log entries from a next tier higher server sourcing the data. This allows a stacked layer strategy where each layer is slightly delayed from the prior layer but can represent a duplicate of the resources in the prior layer.

Because each tier uses the same synchronization mechanism to copy resources to their local store this can allow edge resources, including special purpose application servers, to continue operation even when the back end services which produced the resources are down. This can provide increased availability during failures and provides a window of operation during service failure without negatively impacting user experience.

As discussed below, each synchronization client at each tier may use local filtering to allow vertical partitioning of resources to improve system efficiency. One example of such partitioning is dedicating a subset machines to specific range of users. Another example is configuring servers at a higher tier to filter for specific data. This filtering can be used, for example, to filter for configuration data. In this instance, a service interested in only a subset of data, such as configuration information, can implement a portion of the replication client and use the pull techniques discussed herein to update a local database, foregoing the ability to serve up the data it acquires. In the configuration implementation, a centralized configuration store is kept completely independent of downstream services while allowing the downstream services to rapidly detect interesting changes which they may use to modify their internal configurations. The replication client which updates the service local data may be implemented in complete isolation from either the configion store and the service provided it can call the service configuration update API.

Figure 2:
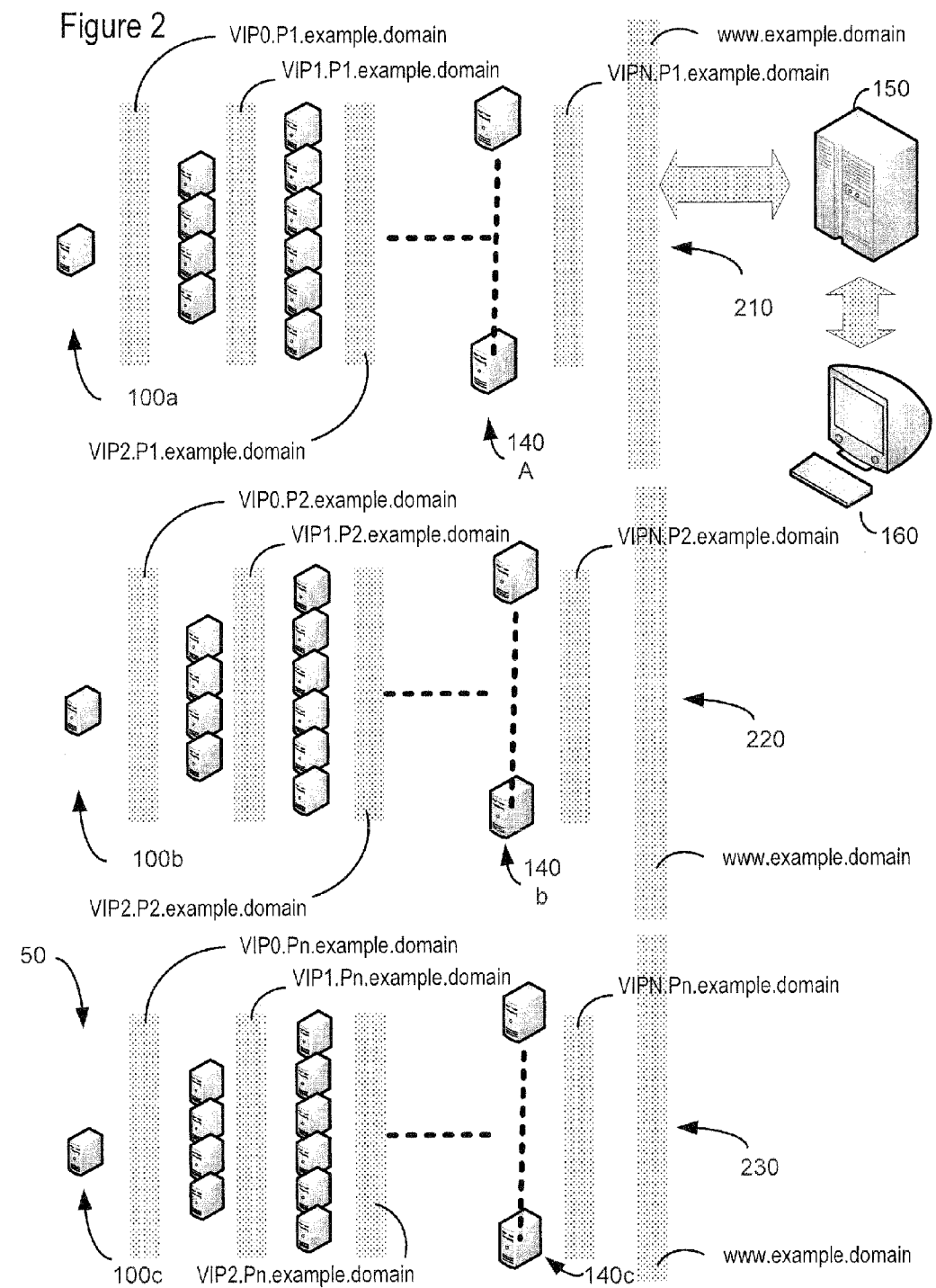
FIG. 2 illustrates a series of environments illustrated in FIG. 1 arranged as vertical partitions in accordance with the technology.
Figure 3:
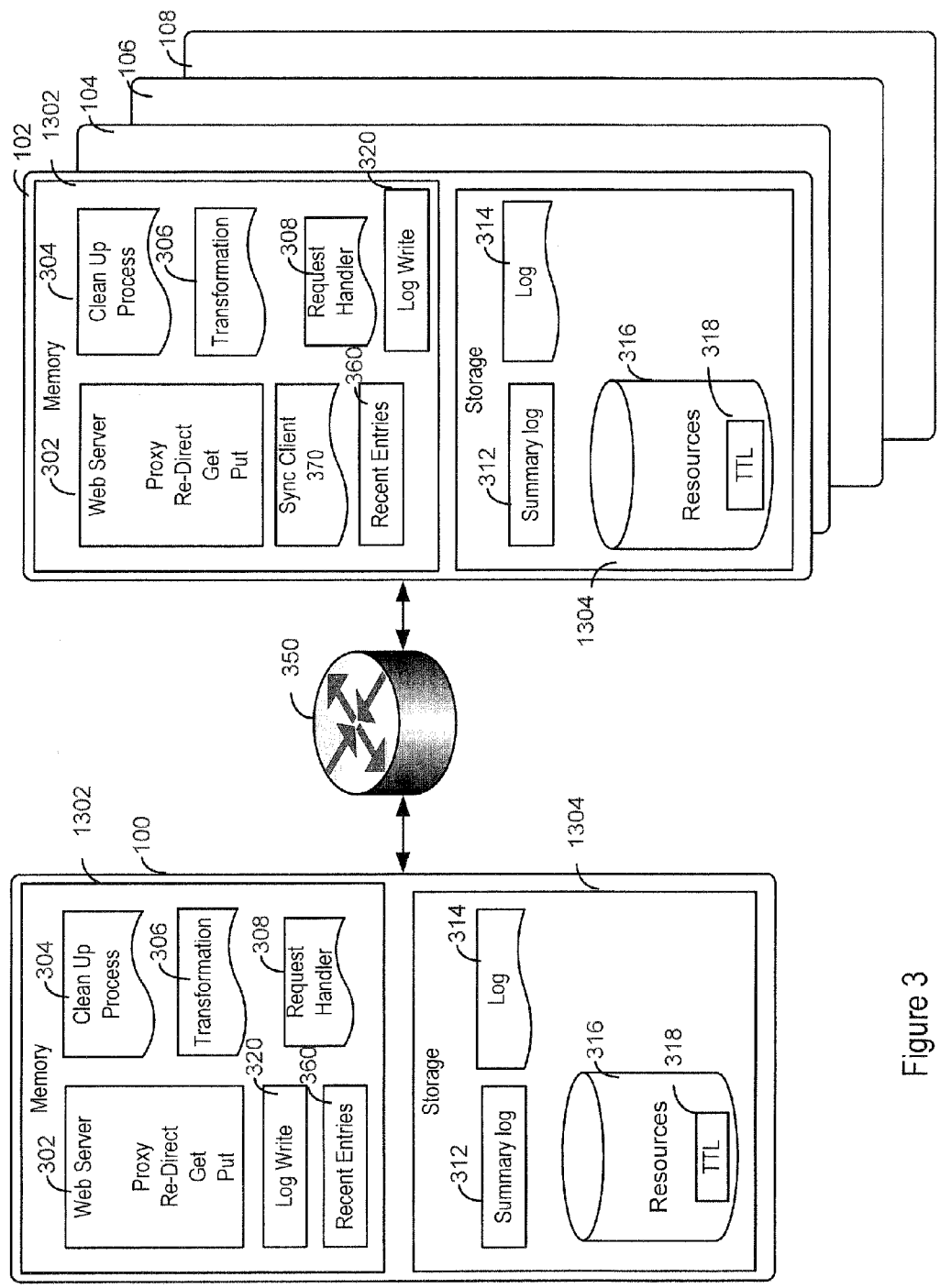
FIG. 3 illustrates components of each server in each of the environments illustrated in FIGS. 1 and 2.

In one embodiment, each successive layer away from the authoritative store 100 increases the number of servers or server clusters by a factor of 4 to 1, e.g. there are 4 times as many servers in tier 120 as tier 110. This allows 1 write server to support 4 read servers in tier 110, 16 read servers in tier 120, 64 read servers in tier 130 and 256 read servers in tier 140. The number of layers and servers discussed herein is exemplary and the illustrations indicated in FIGS. 1-3 are exemplary only. The average propagation of a resource to the edge tier 140 is given by the update time multiplied by the number of tiers. For example, if each tier is averaging 3 seconds for content propagation then a total propagation time of 12 seconds is required for updating the 256 edge tier servers.

Each tier 110, 120, 130, 140 beyond the authoritative store 100 is composed of a group of servers, with the number of servers in the tier (for example tier N+1) set so that when all servers are actively reading files at a defined throttle rate and concurrently reading files from previous tier of servers (e.g. tier N), they will not degrade the maximum write performance of tier N servers by more than some percentage X %, where X may be about 30%.

Access to each layer is provided by routers (illustrated in FIG. 3) and virtual IP (VIP) addresses 105, 115, 125, 135 to allow internal addressing. The separate VIP path (router name entry) for each layer of servers is provided so that any read request from the servers in the next tier (N+1) can be serviced by any server in the prior tier (N).

An external data store service 250, is accessible to the system 50. The external data store service may be a service optimized for handling large sized resources. An example of one external data store service is the Amazon S3 service which unlimited storage through a simple web services interface.

FIG. 2 illustrates a plurality of vertical partitions with multiple authoritative stores 100a, 100b, 100c. Each vertical partition 210, 220, 230 may be virtually, or physically separated from adjacent partitions. As discussed below, it is possible that read requests on edge tier servers 140a, 140b, 140c may be re-directed to servers in other vertical partitions who have the data. Mechanisms in the technology allow for routing such read requests to the correct partition to serve the data.

Each of the tiers may be separated by one or more network links. The tiers may be physically proximate to each other or geographically separated. WAN links are used to connect physically separated servers. Tiers can be organized so WAN links are optimally used. For example when replicating to remote servers, a small number of remote servers are configured replicate from a given cluster across the WAN links. A larger number of servers at the same remote location are configured to replicate from the servers which have already copied the content locally. This minimized the amount of redundant data transfer to across WAN links which are generally more expensive and slower than LAN links. Reducing the WAN traffic in this fashion can dramatically speed up availability of data on all servers of a remote cluster.

To maximize replication rates it is possible to use a lower grade security and possibly not use encryption via SSL for replication between lower tier servers. Any tier which may be exposed to entrusted users or consumers outside a trusted network partition can utilize full encryption and security measures to protect the content. It will be noted that in such embodiments, the N−1 or write tier should be protected by firewalling techniques or anther security mechanism, such as an approved list of servers allowed to contact the source server, should be provided.

Figure 13:
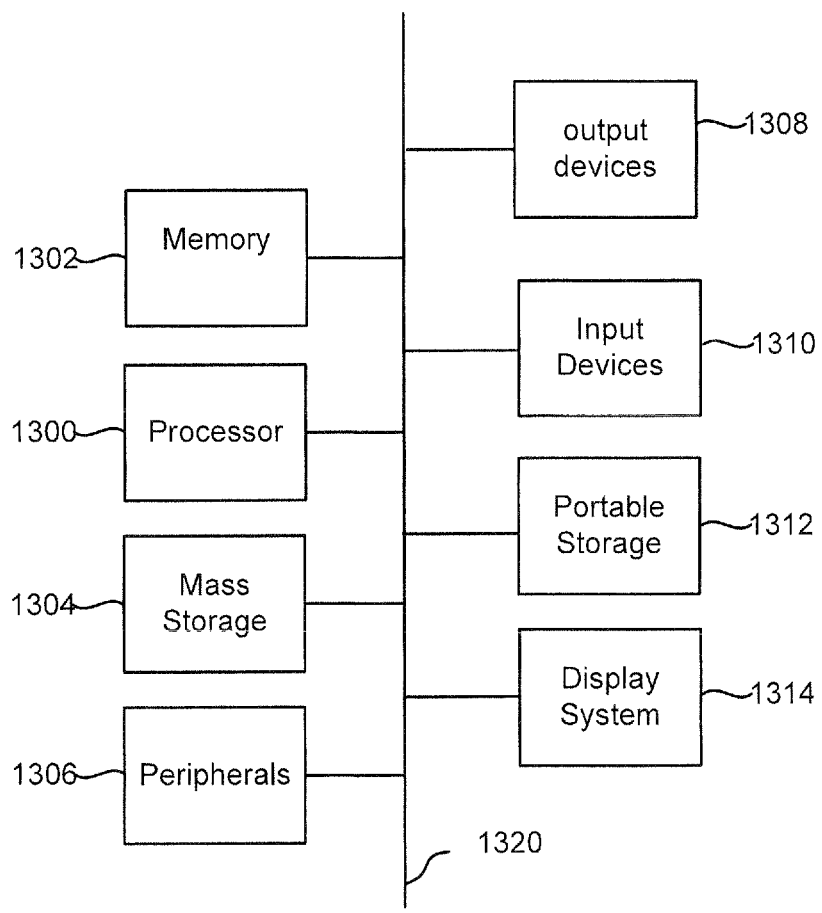
FIG. 13 illustrates an exemplary hardware computing device for the present technology.

FIG. 3 illustrates various components operating in each of the servers in each tier of the system. FIG. 3 illustrates components in volatile memory 1302 and non-volatile or mass storage 1304, described below with respect to FIG. 13. Other components of the server processing device, described below with respect to FIG. 13, are not illustrated in FIG. 3 but it will be understood that such components are present therein.

Each server 100, 102, 104, 106, 108 in FIG. 3 may include in memory 1302 a web server component 302, a log write component 320, a log clean-up process 304, a data transformation process 306 and a request handler 308. The functions of each element will be described below. Nonvolatile storage 1304 includes a write log 314, a summary log 312 and resources 316. Each resource or group or resources may have associated with it a TTL value managed by handler 318, indicating a time out for the freshness of the component.

The web server 302 in each tier responds to HTTP GET/HEAD and HTTP PUT/POST requests to read and write information, respectively, to and from the storage 1304 of the server. For each write, the servers record an entry in an update log 314 using the log write component 320. The log 314 allows each server in a given layer N to deliver change history in small granular chucks to the next tier (N+1) of servers.

A clean up process 304 runs to create a summary log 312 by deleting repetitive entries for the same resource. For efficiency, a number of recent entries 360 in the update log 314 may be maintained in memory for rapid retrieval. The data transformation handler 306 is a background process allowing certain efficiencies to be created in certain portions of the process. The request handler 308 answers updated requests from next tier servers, as described below.

Shown in server 102, and present in every tier server except the authoritative store, is a sync client 370. Sync client 370 acts as a pull agent on the next lower tier of servers to pull data from each successively lower tier. The sync client queries logs 314 in the lower layer tier and uses log information to retrieve resources listed therein using, for example, a standard HTTP GET. The files are recorded in a local resource store 316 of the querying server after fetch. Each resource store comprises the local storage of each server and may comprise any number of different storage elements, including but not limited to redundant storage arrays and storage area networks of any known type. In some instances the authoritative store may be a database may not support miss pass through. In this instance the authoritative store is responsible only to make writes against the next higher tier for each resource changed.

A router 350 directs traffic between each of the servers in each of the tiers using VIP entries for the servers and tiers. This design may include a load balancer that can generally randomly distribute total traffic from the next tier across servers in a given tier. A router or load balancer that can route requests from the same client to the same server with session or IP affinity may also be used. A load dispatching proxy may be used in lieu of a traditional load balancer.

FIG. 4 illustrates the replication process occurring within the system to allow propagation of resources from any authoritative store 100 throughout successive layers of the system 50. At 402 a resource is written to a server in tier N, where N can comprise the first tier authoritative server, or any server in any tier of servers. Once the resource is written, an update to the local log 314 is recorded at 404. An exemplary format for the update log is discussed below in FIG. 8. At 406, the update log is retrieved by servers at the next highest tier N+1. The N+1 tier server determines which entries have been updated at 408 by examining the log entries. New resources are copied from the tier N server to the tier N+1 server at 410.

FIG. 5 describes the replication process occurring on a tier N+1 or "client" server. In this context, a client server is one which is present in a tier N+1 (e.g. tier 120) and reads from a previous tier N (e.g. 110); any tier may comprise the Nth tier. At 502, each server in tier N+1 reads its own local log (e.g. log 314 on tier N+1) to find the last known write for each resource. Depending on the configuration of the log, this may comprise examining a timestamp indicating a last time of a write for a server source in tier N, or a last log count for each source server in tier N that the tier N+1 server is replicating from. At 504, a polling request is repeatedly issued to the tier N server by sync client 370. The polling request may comprise a GET request for the N tier server's write log 314 or in-memory recent entries 360. The polling request may be in in-memory request in one embodiment. At 504, the client repeatedly issues the request for changes to the tier N server unless the client is busy responding to read requests from downstream tiers. As discussed below, the tier N server blocks such requests until new resources are available.

FIG. 6 illustrates a process occurring on the tier N server when such in-memory requests are received from the tier N+1 tier. As illustrated in FIG. 6, the tier N server does not respond to the request unless an update has occurred on the tier N server and has been written to the tier N server local log. At 602, update requests are blocked by default until, at 604, a log write occurs. At 606, the tier N server responds to the request and at 608, upon completion of the response, returns to the blocking state until another update occurs.

Returning to FIG. 5, if an update has occurred on the tier N server at 504, the log is returned and the tier N+1 server uses the last read information to review its own log and find the last successful replication based on a count of the last write. This returns the log changes from the tier N server which have occurred after that write. The tier N server can alternatively determine changes which have occurred since a particular time. At 508, the client parses each line from the log file or files to find each resource updated on the tier N server. At 510, log filtering may be utilized. In one embodiment, the tier N+1 servers may be partition and may only replicate certain content from the tier N server. The URI or URI prefix can be utilized to filter out data the tier N+1 server is not interested in receiving. Filtering may be performed by sync client 370.

Once new or updated resources have been determined, at 510 the client executes a HTTP GET for each resource it processes from the log and at 512 writes a copy of each resource in its local file store at the same relative location in the local store that the resource exists on the tier N server. Standard HTTP semantics send 1 GET request for each resource returned. This imposes at least 1 network round trip and the associated latency per resource fetched. HTTP persistent connections can be used by all clients 370 when requesting multiple resources. Allowing request of multiple items per request reduces the replication delay across WAN partitions where latency can be much higher.

At 514, the client updates the tier N+1 server local log for each item copied from the tier N server.

Many servers may have the capability to store memory caches of resources. When the replication process writes a new local version of a given resource it can invalidate that item in memory. This is supported using cache invalidation so the next reference to the resource will trigger reload. At 516, the client invalidates the in memory cache for each file processed and at 518 updates the TTL age for all the resource or group of resources on the tier N+1 server. In another embodiment, solid state or other forms of memory caches within each server may be used for performance optimization.

In some instances files can contain mutual dependencies so that a change in a file would require information from one or more other files. In this instance, it may be desirable to defer processing of the file until the complete set of changes are written to all interdependent files. In this instance the requesting tier server may modified so that it does not start the processing based on any single file or resource change. The processing is triggered by an activation or sentinel file which may be written into the same directory tree as the resource file. The replication client detects sentinel file which is used to trigger the processing chain. In this way, each tier server generating file changes is free to write new files at will, knowing that they will not trigger the next step in the processing chain until they write the sentinel file. If file versioning is enabled the sentinel file may include the version number for each file which can be processed for this group.

All files are processed in sequence of change because the log entries are processed in order they occur in the logs. If resources which are referenced by another resource are written first then the ordered delivery can provide referential integrity.

The client application generating file changes is responsible to recognize success or failure of each write request against the authoritative store. It should only generate the sentinel file when all the dependant file changes have been acknowledged. Nothing in this section should be interpreted as support of a 2 phase commit. If the client application fails to record all necessary files it is responsible to clean up resources and then re-write those as needed.

This may be supported by allowing each resource change to generate a new resource URI (version), which frees the file change producers to generate new versions of the dependant files without concern for overwriting important changes before the downstream processors have finished their work. In this embodiment, each URI for each resource for each resource may be unique and understood by the server from which the resource is requested to refer to the given resource.

When a "read storm" occurs—a condition where a large number of reads occurs in a short period of time—any server subject to the storm may lose execution cycles. This may delay replication which can result in increasing staleness of the data. This is addressed using the TTL—the TTL for the server may increase which will trigger TTL based cache miss which will trigger refresh of expired files. Each read server may use a sufficient number of threads that it can pull more than one resource at a time.

Figure 7:
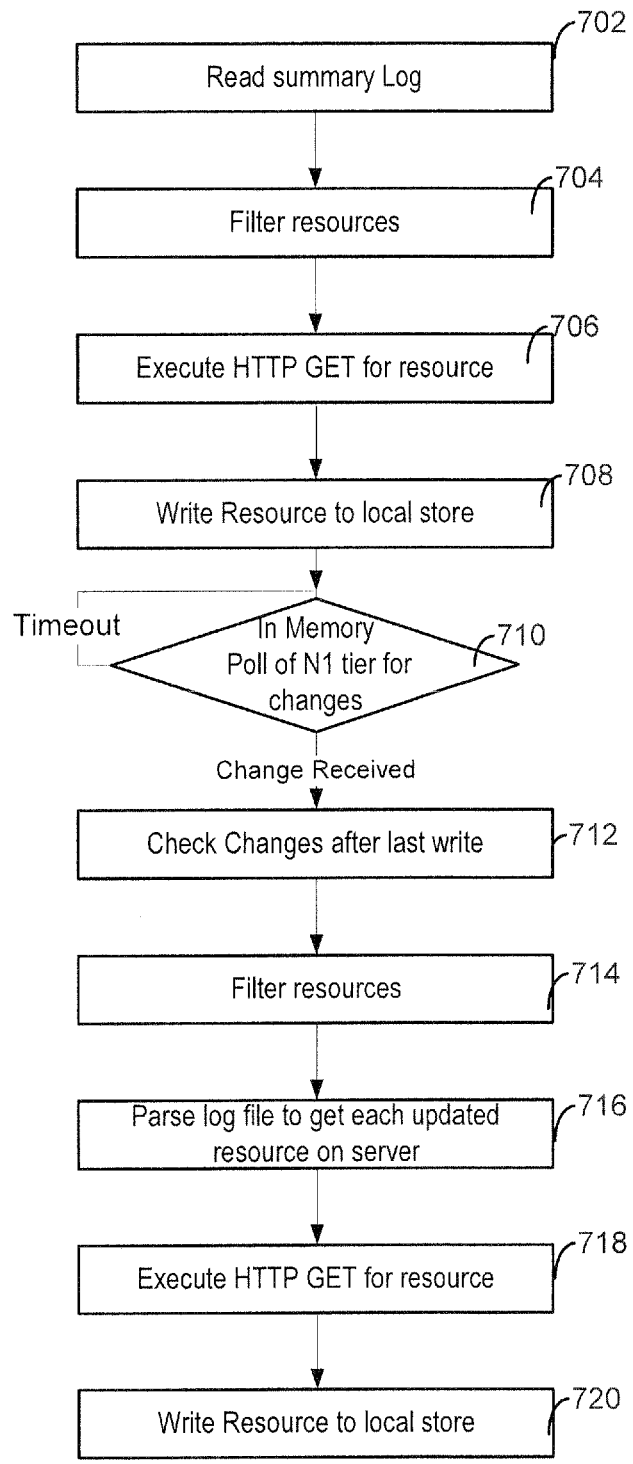
FIG. 7 illustrates a process for adding a new server to the system of FIGS. 1-3.

FIG. 7 illustrates the process by which new servers added to a next (N+1) tier can be added to the system 50. As noted above, each server may create a summary log 312. As discussed below, the summary log is a record of the last write of a particular resource at the time of the creation of the summary log. (Subsequent changes to the resource continue to be recorded in the write log 314, as discussed below).

New servers obtain their initial state by initially reading the summary logs at 702. At 704, the new server identifies all unique resources which pass a local filter, if content filtering for the new server is implemented. At 706, the new server issues an HTTP GET for all resources identified in the summary log of the tier N server which pass its local filter and at 708, the resources are written to its local store. It should be noted that where a write occurs to the local store at 708, the write may be an in-memory write (to volatile memory), a write to disk (or other nonvolatile memory, or both. Because additional writes to the tier N serve may occur during the replication process while writes are occurring at 708, the client in the N+1 layer checks the tier N write log 314 for subsequent writes to resources in the summary log. This occurs in a manner similar to a standard update where, at 710, the client issues a poll request (equivalent to 504) and at 712 reads the log entries for all changes that occurred after the start of the summary log (equivalent to 506 above). At 714, a local filter of the new resources is performed and at 716, the log file 314 is parsed to obtain each updated resource on the tier N server. At 718 an HTTP GET is issued for the new resources and at 720, the resources are written to the tire N+1 local store.

For new servers, a primary build application package including the components necessary for implementing instructions to run the components illustrated in FIG. 3 and described herein can reference a known URI which will retrieve a configuration file. This configuration file maps by server name to a cluster it is participating and provides a URI where the server can go to retrieve the basic configuration data for the cluster At startup each server references a known URI for this configuration information to discover which the clusters in which it will participate. It then accesses the configuration information for those clusters to determine its local behavior, such as which layer VIP it is participating in, which data partition it is supporting, the partition mapping keys, and other information. Due to the number of servers which may be participating, a single resource is created at the default URI for each server by name which contains the URI for the clusters it is participating. For example a server named WN9018.internal.example.domain would have a resource created at servermanage.example.domain/WN9018 which would contain needed information.

There is some risk of a server in a higher layer executing a read request which is routed to a different server on the previous layer than the original server, and that such server will be behind the original server in replication. If this occurs, the downstream server will detect the lacking log entries when it cannot find the higher numbered log entries in the log. The replication server can re-try or wait for the other server to catch up with its most recent entries. This can be avoided by using session-based affinity for fetches to route synchronization requests to the same server whenever it has sufficient bandwidth. This is only an issue if a resource of the same name changes. If a write once unique URI strategy is utilized, then this would only trigger cache miss which would be handled automatically.

Detection of excess replication lag is one indication of server failure. Upstream servers, which detect replication lag in one server which is in a higher level than others, may be able to use this information to request that the router remove or de-prioritize the lagging server when routing future requests.

FIG. 8 illustrates an exemplary structure for the write logs 314. As each file is written to disk a log entry is written to the write log 314 in nonvolatile storage. A sample of 6 log entries is listed in FIG. 8. The general structure of the log entry is as follows: server id, write count, timestamp, action, and local URI (path) written. A linefeed (LF) separates each line. Update logs may be stored in volatile memory to provide more rapid responses by each server. In the event of a server reboot with logs in volatile memory, if the log has not also been stored to disk, resource changes may need to be retrieved by reference to logs at lower tier servers.

The server ID 802 uniquely identifies a server or server cluster and remains the same for all writes on a single server or server cluster. The write count 804 is unique and is incremented for each write to the server or server cluster. No write should duplicate this number when using the same server ID. The time stamp 806 is measured from system count at the time of write. Some implementations may eliminate the timestamp. The action flag 808 indicates the type of action for this resource. Options include "W" for write and "D" for delete; other actions, including "M" for modified may be added. The local URI (path) written 810 is the local path of the file on the server. It is the server relative URI location for the file. Each entry may optionally include a file version number (not shown) in an integer form which increases by 1 for each new version of the resource written to the authoritative store 100. Using a file version allows additional features to be implemented in a more reliable fashion than when the file URI path is simply overwritten. An authoritative write store 100 enforces version numbering if needed for a given resource type.

The log entries are generally recorded as a result of PUT or POST against a HTTP server (or other protocol resource write instructions). Log entries can also be captured in a RPC or handlers which update underlying data.

Where the resources are stored in a database and writes to the database are to be logged, the same logging strategy is used. Each write to the database resource is sequenced and recorded to the log in the same way. All items in the database can be uniquely accessed via a URI style semantic. When used with database operations the recording of the log can be part of the code making the database update or captured in a database trigger.

The technology also supports removing of resources or files from the server's cached set of resources. This is desirable when content which was previously valid is no longer valid or when it can be removed for other reasons. To process the deletes the log entry includes the action D for "delete". The change of the action from W for write to D for delete allows the replication client to detect the desire for delete and remove the resource from its local store. It also invalidates any memory cache for that resource. The authoritative sore can preserve D type action during log consolidation for a period of time set by policy to ensure that all servers have had a adequate time to process the removal. The D-type actions can be removed during log consolidation since the write function would functionally act as a replacement of the original resource.

Returning to FIG. 3, each local write log 314 is updated at the time of the resource is updated. In one embodiment, a sub-set 360 of most recent updates may kept in memory to allow for rapid retrieval. For maximum durability the write log 314 may be flushed to disk after every write. In one embodiment, frequent flushing of the write log 314 makes it desirable to store the update logs in a separate spindle physical storage environment than the resources. This may comprise a separate physical disk in a server or separate redundant array. In certain implementations, clients will fetch the in memory resources for most recent updates, so rapid recognition of changes can be used with minimal network overhead and no disk impact.

In one embodiment, the write logs 314 are recorded and ordered to make incremental access fast and relatively inexpensive. This can be accomplished by a directory structure having the following structure: for each day the local server creates a sub directory labeled by day such as ccyy-mm-dd (Century Year-Month-day). Starting at midnight it creates a new sub directory and starts filling it with new log files. a new file hh-mm (hour-minute). One file per minute with the name hh-mm (hour-minute) zero padded is created which contains all the log entries for all files and entries changed during that minute. If no entries changed during the last minute no file will be created. If no files where changed during a day then no sub directory for that day is created. The one minute granularity may be adjusted upwards or downwards depending on the write load of the server.

The above structure is merely exemplary—alternative structures, times and filenames may be used.

As an alternative to writing log files to disk individual log files can be stored in a database. The advantage of this approach is that no directory tier structure can be established per day. It also allows queries for changes across a unit of time which may reduce the number of discrete fetches needed for a given set of changes.

All the log files may be made available via HTTP GET from the tier N server tier at a server relative path such as ../updatelogs/day/minutelogfiles.txt Each server will also return a list of all logs in the directory which occur after a given time. The log can be consolidated to remove repetitive updates so a single larger log may replace a large number of the smaller log.

Logs may themselves be partitioned in each server to allow read clients to effectively search only those resources which they are interested in. Each server can analyze path prefixes so the logs can be partitioned into separate sub directories. This allows read clients that are only interested in certain read prefixes to avoid the overhead of filtering out log entries.

For example if two files are written ../sites/joemerchant/joesite/web/joe.detail.layoutxml.1 and ../system/items/00019919/baseitem.ion, the write handler has the ability to detect the ../sites and different ../system/items, and record the log entries in a separate sub directory such as ../writelog/sites versus ../writelog/items. This is configured with simple path prefix matching. This mechanism may allow "path-prefix+ file extension" to be used to determine the replication prefix.

As a result of the partitioning of the logs, the read cluster for resources in the subdirectory ../system/items may have a read load which is 1,000 times higher than required for the ../sites configuration data. Servers can process only the write log entries they are interested in without looking at the others. This optimization reduces the costs of analyzing log entries and applying the copy filter at the replication client. One implementation will include configuration based support to partitioning write logs based on simple path prefix matching.

As also illustrated in FIG. 3, each server also provides a virtual resource handler 308 which responds to the layer N+1 polls for updates. The handler 308 will return immediately if it finds any updates newer than the specified timestamp. If necessary the server will merge in memory log updates and those represented in multiple log files to obtain the data. This function supports paging truncating the list at 5,000 items.

The virtual handler 308 allows the tier N+1 server to call it repeatedly and block until a new update arrives. The server will recognize a new entry immediately and return that single line or multiple lines which allows a change recognition for an individual resource. After processing the updates the tier N+1 will call the same resource but will use a new timestamp that is equal to the timestamp of the change of the last resource processed in the last call.

This handler 308 can also accept a request for changes after a write-count number, where the WriteCount is a serial number representing the last write the client processed is available. In this instance the server simply returns the first set of writes occurring after a WriteCount.

Handler 308 implement a simple limit of 5,000 records. A limit may be used because the replication client will take time to replicate that number of resources referenced. The client calls the same handler 308 again after processing the first set of changes and receives the next set based on the timestamp or write count of the last item in the prior batch. It repeats this loop until it is blocked waiting for changes (as discussed with respect to FIG. 5).

In memory entries 360 may be flushed to storage after every resource write. However, spooling of entries in memory and writing to the disk in later batches also may be implemented. If used in spooling mode, when an unclean shutdown occurs, the server can walk the entire local storage resource directory structure to find individual resource update timestamps and regenerate any that may have been lost as a result of the spool not being flushed. The immediate flush removes the need for such a extensive walk but could degrade maximum write rates for the server.

As indicated above, resource content filtering on each of the servers may be implemented (at for example steps 508 or 704 above). Every resource written has a predictable URI. This allows N+1 tier servers to read URI from the next lower layer of server N (or the authoritative store) and filter it. For example, where the system 50 is used to implement a Web-based electronic commerce system having, for example, items for sale from a catalog, a server processing only catalog items could look only at the path prefix such as ../system/catalog/items and ignore items such as ../system/siteconfig. This capability allows resources which have read storm characteristics to be replicated more heavily and through more layers to guarantee high speed access. It can be particularly effective when the resources have low change rates relative to the maximum read rates. This type of filtering is particularly effective for application servers which only need a subset of the data for their local caches. It minimizes the cost of processing for unwanted fragments to a simple single line evaluation of the URI without the associated GET or an extra network round trip to fetch the unwanted resources.

Access control within each resource store can be treated at the sub-directory or any child-directory by allowing a htaccess file to be synchronized as one of the fragments. This requires the local web server 302 to include a security handler enhanced to reference these files and apply them to all files in a directory and all children of a directory. An alternative is to have larger .htaccess resources for the entire server in a location where it can be easily replicated. This latter approach would require triggering the reload of the htaccess file on receipt of new changes or using a relatively short TTL.

Figure 9:
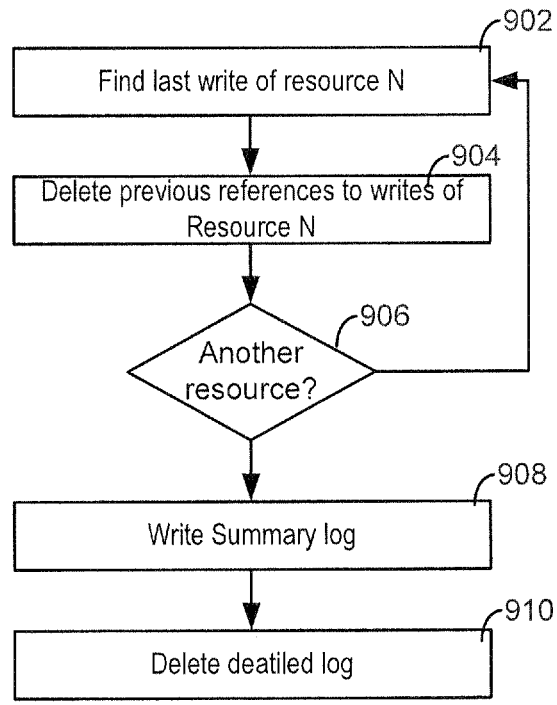
FIG. 9 illustrates a cleanup process used in accordance with the present technology.

FIG. 9 illustrates the log cleanup process which creates a summary log 312. When using the above mentioned one minute write log creation interval, log proliferation creates 3600 write log files per day. This can slow a build when bringing new servers on line because they may be processing changes to the same file hundreds of times. To reduce this cost, each server runs a low priority process which analyzes all updates to a given resource and collapses updates to the same resources so only the last update for a given resource is retained. This may be done on a periodic basis. In one implementation, it is first on a hourly basis, then a daily basis and may roll up across time so that, at the highest tier, only the most recent version of a given file is retained in the periodic summary log 312.

In FIG. 9, at 902, the cleanup process determines the last file of a given resource on the server. Each resource may be stored with a unique path which would prevent same named version consolidation, however there is a semantic relationships across files which allows the server to find only the set of files which are referenced from a valid release and eliminate all version numbered files which are not referenced. At 904, the process identifies all references to all files which are not referenced and which are older than a given time frame that can be deleted. The most recent entry is recorded in the summary log. The process loops thorough each resource at 906. It should be noted that the cleanup process takes a lower priority and may run as a background process so that any read and replication of resources takes higher priority in the present technology.

Once all lines from a detailed log are recorded in the summary log at 908 then the detailed write log can be deleted 910.

A timestamp of the beginning of the log cleanup is recorded as part of the summary log. This timestamp is used by tier N+1 servers to determine where they should start processing detailed log entries from tier N servers. This approach allows the summary log to be created on a hot basis without blocking further writes or replication from the server. As noted above, the log summary process is a low priority so it does not affect the write or copy rates from the system 50. In one embodiment, the log update process is a lower priority process than the read process.

In some cases, a GET request will be made to a tier N+1 tier server before a given resource has been replicated to that machine. This would normally result in the GET request failing with a HTTP 404. In one embodiment, instead of immediately returning the 404, each server is configured so the N+1 machine acts as a proxy and fetches the required file from the previous tier of servers.

Figure 10:
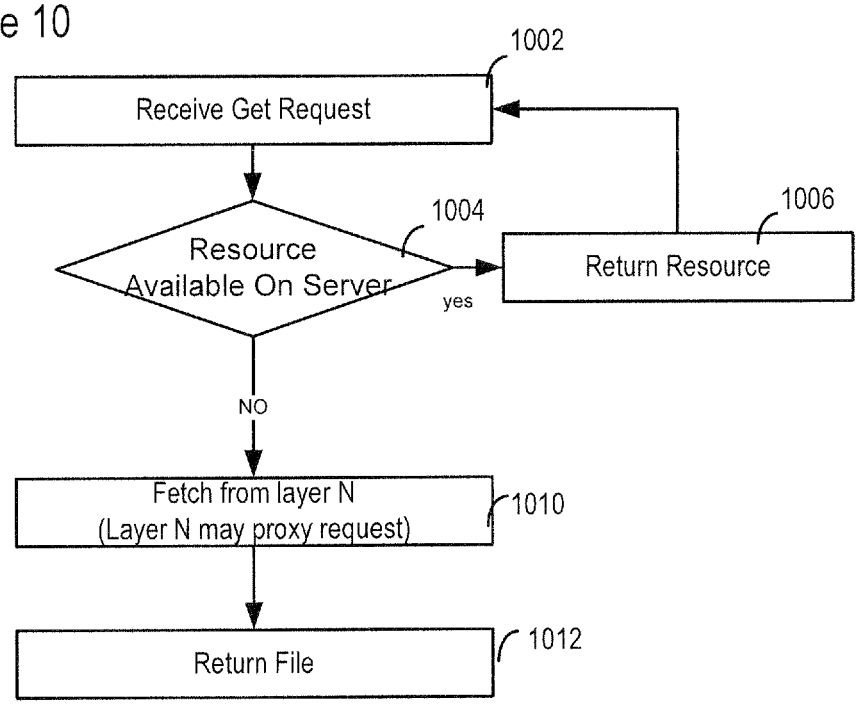
FIG. 10 illustrates a log summary process used in accordance with the present technology.

This process is illustrated in FIG. 10. At 1002, a layer N+1 server may receive a GET request for a resource. If the resource is available, at 1004, it is returned at 1006. If the resource is not available, the layer N+1 server looks to fetch the file from another, previous layer N at 1010. When the resource is fetched at 1010, it is recorded to the local store in the N+1 at 1012. As an alternative to being copied locally, a 301-type redirect to the other peer server or tier N server may be used at 1010. In an alternative embodiment, when the read servers are implemented with environments which can provide very high speed peer to peer communications, the read server may query 1 or more peers in the same tier (e.g. tier N+1) for the content before using the GET from the next tier at 1010. This is particularly effective when the previous tier is on the other side of a slower WAN link.

When the resource is sought from the tier N server at 1010 if the file is present it will be returned at 1012. However, if the resource requested from layer N is not available at layer N, the tier N server will also perform the method of FIG. 10 looking to the next previous tier (e.g. N−1) for the resource. If the file is available, it is returned at 1012.

This proxy system can be augmented with TTL semantics which invalidate local resources and trigger a cache miss. Each resource or set of resources can be assigned a TTL value, preventing the resource from being returned in response to a GET request after expiration of the TTL value. The time for replication across all layers should generally be shorter than the shortest average TTL for any object in the cache tier. In a "worst case miss," where the TTL expired at every layer, the delay time is only the sum of the latencies of the read layers and in most cases, this would only propagate through a fraction of the layers.

As noted above, a TTL value may be assigned to each resource or set of resources. In some cases, TTL based request storms can occur where a large number of resources expire at the same time. This can be eliminated by providing a rule which states that no file can be less fresh than the current replication lag on a given server. Since the server knows that no resource has changed that it does not know about, it can completely eliminate the traditional HTTP GET or HEAD needed to ensure its content is sufficiently fresh.

In one embodiment, an intelligent TTL handler 318 is provided which first compares the last time stamp of update from the log system and uses it to override the age calculations for individual resources. This allows an update of 0 or more files from the log stream to reset all TTL ages. This can completely eliminate all TTL related GET or HEAD requests even for a very large file sets It is reasonable to expect a single system to store 10 million or more resources. If each resource had 10 minute TTL and if they where managed through a typical cache system and the server was heavily visited by robots, it could result in 1.4 billion cache misses per day. In contrast the intelligent TTL approach would have very close to 0 misses which effectively reduces the read load against the resource by 1.4 billion requests per day.

In general, update rates are limited by the maximum write rate of a given write cluster, e.g. the update rate of a tier N+1 tier is limited by the write rate of the N tier. In some applications, limiting write rates may be unacceptable, especially in large scale systems. In order to address this limitation, vertical partitioning is used in the system.

Vertical partitions are illustrated in FIG. 2. Each partition may be addressed by a different address, which in FIG. 2 is represented as P1.example.domain, P2.example.domain, . . . Pn.example.domain. All clients accessing www.example.domain are redirected or routed to a proper partition based on a computed partition. Each request results in a hash code calculation which identifies a hash bucket of respective URIs from which the URI is resolved and the request routed based on the partition address.

Each partition can meet the same availability and durability requirements of its authoritative store 100. This allows all writes for a subset of content to be routed to different servers within a given tier. The partitioning may also be driven based on total storage requirements rather than update loads. In general, partitions are reflected vertically to allow read rates that are much higher than write rates for any single partition. The new write rate limit is the sum of the maximum write rate for all partitions and the system can scale to larger number of partitions at need.

In order to implement partitioning and efficient addressing, addressing is based on a 16 bit hash key and an assumption of 1,000 writes per second of 0.1K to 100K files per authoritative write store. The 16 bit hash key provides a maximum of 32,768 hash buckets which if all writing at maximum rates would allow 32.768 million writes per second.

Any single cache signature could be allocated to each partition and a single partition may be dedicated to a given hash key which allocates an entire cluster of hardware to service writes for single cache key. It is possible that hash key overlaps could result in traffic that exceeds that capability of a full cluster. When this condition is detected a second tier lookup may be used. In this second index, the hash key is calculated using an alternative algorithm and then indexed to a specific cache partition using the second hash signature to index into a separate partition map. This is expected to be a rare occasion so the second hash map is treated as a sparse matrix.

Each server may be provided with a unique name. The unique name is mapped to a partition (p1, p2 . . . pn) and a layer (VIP0, VIP1, . . . VIPn) using a simple configuration file. Each server knows the partition to which it has been allocated. Each tier of servers of each vertical partition can have a unique VIP (DNS name). The router(s) handles routing of requests to all machines registered under that VIP domain name. The routing may be handled in a round-robin fashion, or other by other balancing techniques. Each server at a given tier (tier N+1) can be configured to know the VIP name of the next lower tier (tier N) of servers. All configuration elements are represented as simple resource fragments that are replicated to all servers as part of standard replication process.

A standard hashing algorithm is used to produce a 16 bit integer from the URI of the resource. This integer is used in a hash table lookup where it resolves integer number which may be between 1 . . . N partitions. This integer is used to look up a partition number. This information may have a form similar to:

10109,3
10110,3
10110,6

This file information is generated and stored as an ASCII resource and distributed through a non partitioned branch to all replication client servers. Each of the possible buckets is mapped to a partition. The simplest version of this file would contain a single entry per possible hash code which is estimated at 16 bytes of memory per hash code would consume 512K of Memory. Extension to support hash ranges may be added which may reduce memory consumption. This is assumed to be an in memory hash table which allows rapid lookup of the bucket.

One the system has identified the bucket number the bucket number is resolved to a given URI for the front most edge of the partition where the data for a given URI path exists. This second lookup is used because it is unlikely that any system will actually use N partitions. In source form this would look as follows.

3, p3.example.domain
4, P4.example.domain
5, P5.example.domain
99, P1.overflow.example.domain The source files for these maps are stored at the authoritative write store for the cluster and are replicated like any other resource. They are replicated using the option to skip partitioning which allows them to be replicated to all partitions which effectively ensures they are available on all servers.

Other addressing schemes may be utilized in accordance with the present technology. As noted above, a path prefix analysis partitioning applied before hashing allows this partitioning to be extended to filtering as necessary.

In certain situations, a given client may try to access content at edge tier servers which may not contain the data needed. In the present implementation, it is desirable that each server at each subsequent tier (e.g. tier N+1) not be required to understand the vertical partitioning, allowing flexibility in the configuration or number of partitions.

The use of the HTTP redirect described in FIG. 10 allows the edge servers to return resources without knowledge of vertical partitioning. The HTTP redirect does require each layer of each vertical partition to be assigned a unique virtual domain name to allow re-routing.

In many cases the maximum write rate for given write partition is very similar to the maximum write rate for downstream cache servers so the partitioning may need to be replicated all the way to the edge cache. Consistent hashing is used to determine which partition the data for a given URI will be located.

All updates are effectively written over existing resources of the same path. To avoid the possibility of returning a resource which has been partially updated if a server where to request the resource while it is being updated, all replacement of existing resources can be written to a different key space such as "original file path+timestamp+.tmp." Once the new copy has been fully written, the old version can be deleted and the new version renamed to the original key. If updating a database resource, any individual update is assumed to be atomic which means the local replication client can download the entire resource and process its updated in a single database transaction.

With reference to FIG. 10, for inbound read requests where a server at the N+1 tier determines that a given request for a URI resides in the partition it is responsible for serving, it will process the request from its local cache as normal. If it determines that the data resides in a different partition, it may return a HTTP redirect to the appropriate partition. For example a client may access example.domain/joe/parts and the sub URI "/joe/parts" resolves to partition 4 which is mapped to P4.example.domain which is returned via a HTTP redirect to the client as P4.example.domain/joe/parts. P4.example.domain represents a DNS resolvable name which may be a round robin queue which will be fronting from 1 . . . N servers. The client then fetches the appropriate content from redirected URI. The client may also choose to remember where it was redirected for that piece of content to avoid the 2 step process in the future. Alternatively the server which receives the data may choose to act as a proxy and directly access P4.example.domain/joe/parts and retrieve that data on behalf of the client.

Write request handling is largely processed the same as a read request. The primary difference is that the write or PUT request is by default proxied by the receiving server to the appropriate partition by default.

Figure 11:
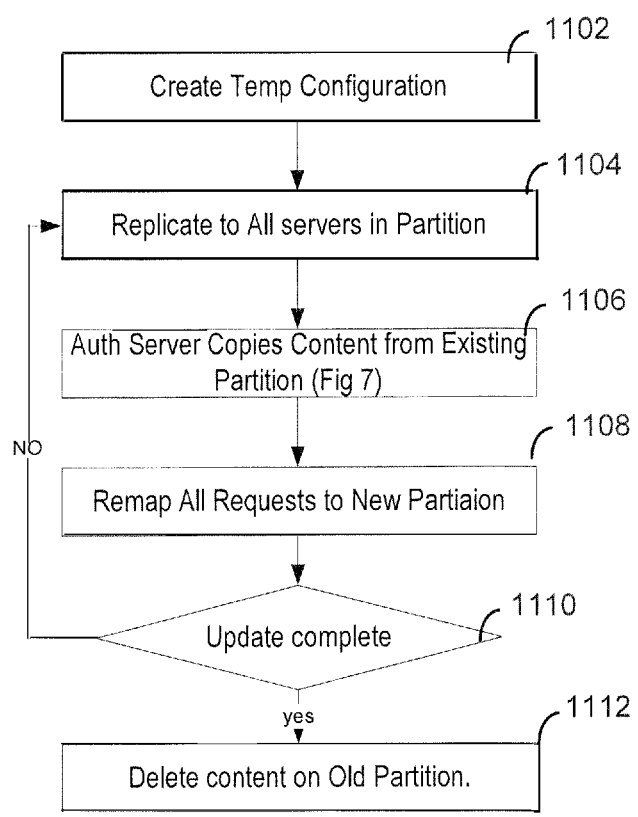
FIG. 11 illustrates a proxy process used in accordance with the present technology.

As the system grows additional partitions will be needed. The process for adding new partitions is illustrated in FIG. 11. At 1102, a temporary configuration is created to determine which hash codes will be mapped to the new bucket. At 1104, the temporary configuration is replicated to all servers, with the original configuration is retained under a different name for use during creation of the new partition by writing servers until the resource copy is complete. The changes are replicated to all servers. At 1106, servers in the new partition begin to copy content from the servers where the content currently exists. At 1108, during the copy process all read requests for content needed but not yet copied are retrieved as a proxy from the current location which is determined by referencing the old configuration information from hosts in new partition. All hosts outside the new partition map all read and write requests to the new partition URI. Once the write of each piece of content has been confirmed at 1110, the resources are deleted from the old servers at 1112. The delete may be delayed slightly to allow propagation through all layers of the cache in the new cluster.

Partition resolution data can be changed and replicated when all network partitions are available. All replication clients will not receive data simultaneously so data moved from one partition to another can be reached at either point. Update write requests may be routed to the old partition for a period of time.

In some cases, content for the new partition is scattered randomly across existing partitions. New partition write servers retrieve the full list of all content from each partition by reading their summary logs. They apply the partitioning lookup on each resource listed in the summary log and determine if it belongs in their partition by applying the hash semantics. If so, a GET is used to fetch the resource and do a local PUT of the same that resource to their local store. After the write has been confirmed the original content is deleted from the old location. This requires use of an additional query parameter which causes the old location to temporarily ignore their partitioning logic otherwise they would issue a HTTP redirect.

Partition removal is handled in a similar manner. The primary partition configuration is left unchanged while a temporary configuration of the new server mappings is written and propagated to the authoritative write server of the partition to be removed. At this time, all write requests are proxied by the partition to be removed to their new location by the authoritative write servers in the removal partition. The authoritative write store walks its content tree and issues a PUT to the new partition for each resource based on its calculated location based on the new partition map. Then it issues a delete for the resource after receiving an acknowledgement from the PUT. Any read requests are proxied to the new calculated location. If the new location does not have the resource the local store is checked. This may be reversed for optimization.

During this time a portion of the content will be in the new partition and a portion will be in the old location and the amount will change as the copy and delete operation continues. When all content has been removed and copied to its new location the primary partition configuration is updated to reflect new data locations and is propagated to all servers.

After the configuration information has been propagated to all servers the old partition can be removed. Ideal to leave this in place for a period of time and only remove after it receives no requests for a period of time. It is also viable to remove all but one server and remap all layers to this server which simply acts as a proxy until all servers have started using the new partition map.

Partition splitting may be performed in the same manner as the creation of a new partition. The main difference is that all resources which need to be moved reside on a single partition which allows the split to occur as a result of a single walk.

To minimize replication of files that may have been written on the server but did not really change on the client, a MD5 type hash can be used on the contents of the file. The reading server (tier N+1) can compare its hash code for the files current contents with the hash in the write log. If the hash is identical, then the tier N+1 server can simply change the modification time of the resource to reflect the server timestamp and skip the GET. The unique hash code may be added to the write log immediately before the relative path as shown by the string "82828288" in the sample below:

ws1,27,  20090131102,W,82828288/example/items/ 00019919/[filename]

Depending on data freshness requirements it can be necessary to limit the size of items written into any partitioned write area. This is necessary because a number of larger resources such as images may delay replication of smaller fragments if they are mixed in the same log partition. By partitioning larger files into separate partitions they can be replicated at a different rate. This is based on the assertion that some files need to be replicated quickly while a large image or video would have less impact. A very large file can prevent propagation of the next file. The copy of a large multi gigabyte file could take several minutes over a traditional WAN link which would reduce the freshness of any files in the queue after the larger file. If this conditions persists for long enough, the TTL for some content could exceed the server replication age which would trigger a larger number of cache misses for content with a TTL shorter than the replication lag.

To prevent large files from delaying replication of smaller files a special semantic is used. In lieu of replicating large files immediately, a smaller place holder or proxy file is written. This proxy file is replicated as normal. The replication client recognizes these proxy files and adds the need to replicate the larger file named in the proxy to a lower priority replication queue. This allows the replication client to move onto subsequent files with no extra delay. If the large file replaces an existing file then the proxy file may delete the original file at the time the proxy file is detected or mark that file for special expiration so that if it has not been replaced by the time its TTL expires the original is deleted.

If a client attempts to access the larger file before it is replicated then the last version present would be served unless it has exceeded the TTL. If the TTL has expired or if the resource has not arrived then it is treated as a standard cache miss.

In some instances an excess number of large files may exceed the disk space available in the servers. In this instance, an alternative is used which allows the remote replication server to defer fetching the file until first accessed and to clean these files using standard least recently used (LRU) cache algorithms.

When many large files are stored, they may be saved in an external storage array or other system 250 optimized for large scale resource management. When using the external array, the client 370 or higher tier is responsible for writing a copy of the file to the array or media service 250, and generating a URI where the resource can be accessed. This URI is included in the proxy file which is replicated using the standard mechanism. When the replication client receives the proxy, it can choose to either retrieve the resource or to wait until the first request for the resource is made and then manage the total disk space usage using a LRU mechanism to clean out the least used resources.

When using large file optimized services 250, the reading server may retrieve large resources directly from those stores to minimize extra network overhead. In that instance the server may return a HTTP redirect to the reading server with the URI where the larger resource is available. This presumes the large resource storage can be accessed by the reading server.

When writing larger files, extra attention can be paid to ensuring the resource is written completely before a the reading server is allowed to access the local copy. To ensure this occurs, the resource is written under a different name such as "requested path+timestamp+.tmp" and renamed when the write is complete.

Returning again to FIG. 3, any replication server may implement handlers 306 which transform the data pulled from a higher tiered server. The transformed data may used by the client 370 or a replication server in another layer to trigger updates to back end services and databases. By convention the original resources should not be changed. If the data is transformed or changed so that is not byte compare equivalent then it should be stored under a new resource name.

Client 370 includes handlers 306 that allow transformation and write to alternative resources names that can be implemented in the same language as the client and dynamically loaded based on path matching and content type semantics. The pluggable transformation agents may also be used to call API in other services which allow local services which have their own repositories or databases to be updated based on changes in the content.

Data transformation may be used in a number of contexts. One of these is summarizing the first page of reviews shown in a detail page. This data only changes as the reviews are approved so the data summary view changes relatively infrequently.

Transformed data may include elements of web pages which require updating, where the entire portion of the page does not require updating. Consider, for example, an electronic commerce system where a number of items is offered for sale. It may be desirable to determine the "best" offer from amongst a series of sales offers. In one embodiment, the calculation may be made and written to the authoritative store. In another embodiment, this calculation and accompanying data may be made at one or more of the tiers in system 50.

In some instances, a request may be received for a resource that would normally be generated during transformation and which has not yet been generated. This would generate a cache miss that in many instances would propagate all the way back to the authoritative store.

In one embodiment, the authoritative store handler 306 can dynamically generate the resource on demand. This eliminates any need for the lower tiers to have custom handlers for data transformation on the fly. In another embodiment, edge tier servers can to detect the cache miss and compose the resource needed by accessing the other pre-transform resources.

It may be desirable to use the CPU resources present in one of the servers to dynamically generate the transformed resources when needed. In this instance, a handler which represents a virtual resource is used. The server first detects a cache miss and before attempting to access the next lower tier, checks its list handlers (which may be local or remote), and uses that handler to dynamically generate the missing resource using other resources or external data sources. Once this is done the server returns the resource as needed. It saves a local copy and writes the generated resource back to the authoritative store using a PUT. The write back is based on the presumption that if accessed once the same resource has a higher probability of being needed again and there is no guarantee that the next access for the same resource will land on the same server where content was dynamically generated.

Certain cases may occur when a file which contained data used in a transform changes the transformed view can be invalidated. For example, using the electronic commerce example, a product summary record may have been generated using data from many sources including 1 . . . N offers. When one of the offers changes, the generated view needs to be deleted so it is not used and is forced to be regenerated. Generation of this type of transform should occur in the authoritative write store where the generation can be triggered at the time of change. However, this approach consumes resources in the authoritative store. Another approach is to scale the transforms such that this type of entry is regenerated on a sufficiently frequent basis that the new transform is available before the TTL in traditional caches expires. To support this in the servers, a list of dependant transforms is maintained for each atomic asset. This list is referenced whenever a given asset is changed and then the dependant transforms are scheduled for deletion. This analysis or detection can be assigned to a small number of servers at the lowest tier set of servers possible and the deletes can be written against the authoritative store using the standard process. This can be implemented so the priority deletion servers are present in each vertical partition. The servers responsible for deletion processing may be configured to handle fewer or no inbound cache requests so they can allocate a majority of their capacity to CPU detection. Priority deletion servers may be allocated a subset of the write logs using the standard filtering or log partitioning to guarantee rapid response.

Additional data transformations can be enabled at the sever tiers closest to the edge (e.g. servers 140) which transform the basic file fragments into those optimized for rapid rendering of common pages. This transformation is done by low priority processes. Any new fragments generated can be replicated to other servers, which may receive a request for the same content. A specialized handler (not shown) may be implemented so that a cache miss of this content can cause the content to be rebuilt from the lower tier fragments present on the server. An alternative cache miss strategy is to allow the servers to rebuild the transformed representation of the data based the lower tier fragments directly. Leveraging background processes in this fashion allows higher effective machine utilization during idle times while minimizing work done to yield final rendering forms of the data during peak times.

Due to the number of hosts participating in the edge cache, there is a substantial amount of unused CPU power during non peak moments on these machines. To maximize the benefit derived from these servers, partitioning of the data they traverse when building transformed data types can be utilized. The actual partitioning information can be replicated as file fragments and treated as a queue so each summarization process is awarded small units of work from the queue.

When summarization work is done by the edge cache, it may be replicated to all other servers serving the same type of data at the same tier of the system 50. Data may be written into all machines of a lower layer. By writing such data to a lower tier, the transformed data is automatically replicated towards all servers in the edge cache which deal with the same set of data.

It is ideal if the server layer supports registration of dependencies for transformed or summary views so that if any of the file fragments referenced to build the transformed view change they any transform generated views that where built based on the content of those files is automatically invalidated. This is ideally extended to allow registration of that summary view for rebuild on a priority but less than real-time basis.

Some use cases mandate that the freshest data be used. A good example of this is in electronic commerce system where a customer has recently changed a shipping address. In this case, the most recent current shipping address should be provided on any page rendered by the web server 150, even though the page rendering may be from a different rendering server than the one responsible for the update request.

One solution is to identify such cases using a standard HTTP header cache-request-directive "no-cache". If this is received by an edge server, then all system tiers may treat this as a cache miss and will proxy the request to the next lower layer until the first layer or authoritative store is reached. This technique can create request storms on relatively constrained hardware. Due to the ability of this directive to create request storms at lower tiers, one solution is to not honor the request and issue an appropriate error message.

Another solution is to allow the standard HTTP cache-request-directive "max-age" to specify that data can be fresh within a given time frame. This can be used in conjunction with "max-stale" which allows the server to return data that may be stale but the server can attach a warning 110 (Response is stale) if the content age exceeds the max-age. For example if the max-age of 1 second is used for a customer-shipping-address.xml, the server will check's its recorded server age. If the replication age is older than 1 second, the server will check document ages and if it older than 1 second, the next lower server tier will either return the content or refer to the next lower tier until it reaches the authoritative write store. In most instances the replication will be complete before the client request arrives at the authoritative write store. However, if the data has only replicated through a portion of the server layers, it will be found at the highest layer it has made it to and then pulled forward. It is desirable to use the largest acceptable max-age to minimize cache misses.

In the event of a network partition which prevents a server in one layer from reaching the next lower layer that tier will return the most recent data it has and will return the Warning 110 (i.e. response is stale). Each cache layer will update its local age for the content that is retrieved in this fashion to prevent the next cache miss. This warning can be returned through all layers to the reading server.

The tier servers may use standard HTTP HEAD or GET which allows the servers to return a 304 indicating the content has not been changed rather than copying content which has not changed. If the client receives the warning 110, it most likely indicates a network partition failure.

In the case of the customer shipping address, mentioned above, a small lag may be allowed before rendering the content. For content of this type, the use of relatively small files and small vertical partitions allows rapid propagation. Assuming a blocking read on the log changes (defined above) and a 4 to 1 server mix, a sub 2 second propagation can be delivered in a 3 tier, moderately loaded cache which provides 16 read servers. At an average read rate of 5,000 reads per server per second, this supports a max read rate of about 80,000 reads per seconds with a sub 2-second propagation delay.

As defined above, under normal operating conditions, all write requests are proxied to the authoritative write store for the vertical partition which currently owns content a given URI space. This creates a problem in the event of network partition failure where clients of the system need to updated.

An example of this would be using two geographically distinct datacenters, where one data center, for example located in the United States, provides backup for a second data center, for example provided in Europe, during outage conditions, and the authoritative store for a given set of data such as Customer profile for European users is normally located in Europe and replicated to the USA. During the failure condition when the USA data center is in operation assume that a customer wishes to change a component of their profile such as shipping address. In the normal operating condition European cache server would receive the request and simply proxy it to the proper local authoritative store. During the failure condition the USA server can not reach the European server which would prevent the write from occurring which would be represented to the end user as an availability issue.

There is a need for cache servers operating in a remote data center to optionally allow local spooling of writes during network partition failures. For data which can tolerate some inconsistency, the process of FIG. 12 is utilized.

Figure 12:
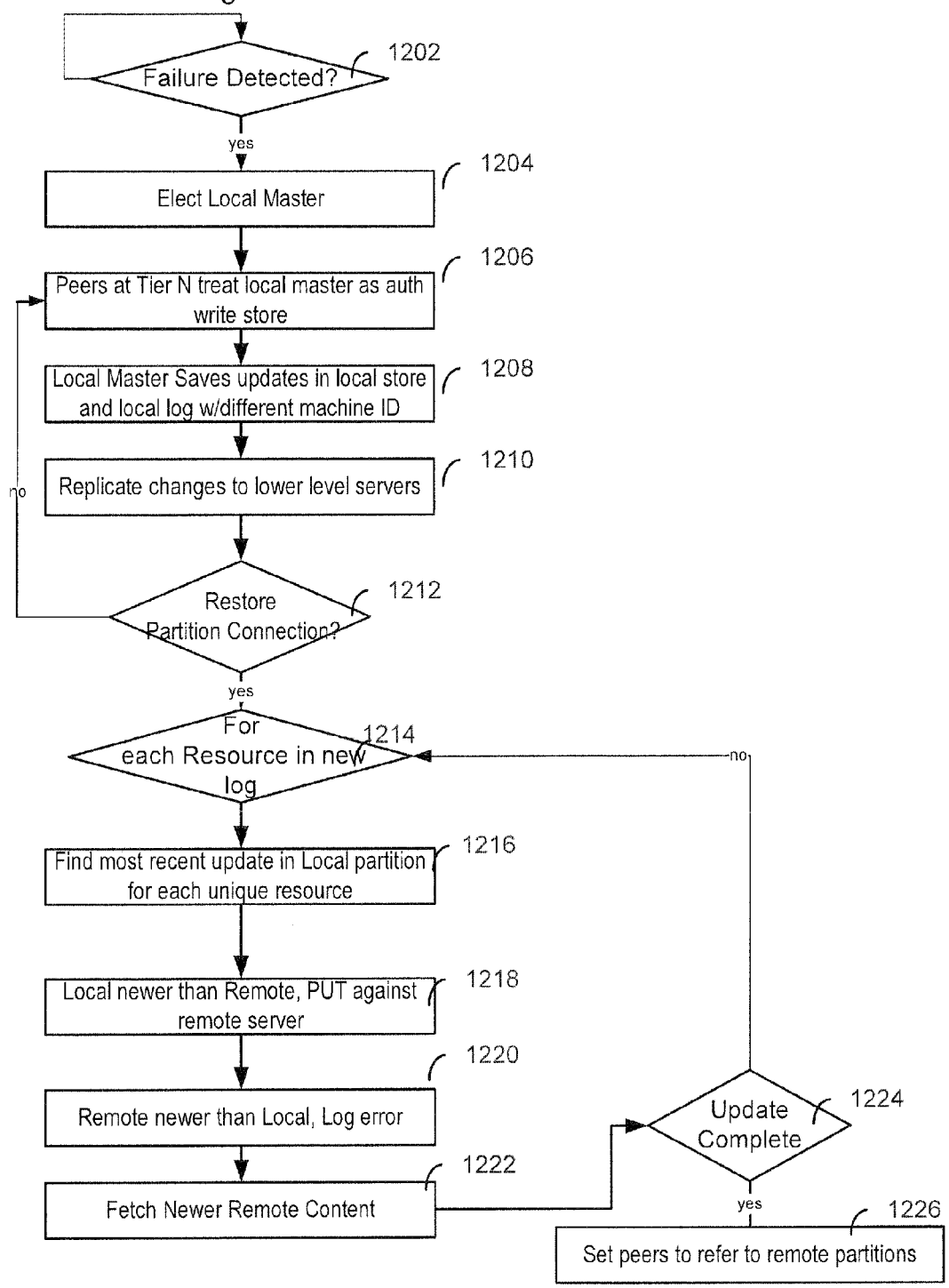
FIG. 12 illustrates a process for allowing network write operations in the event of a partition connection failure between partitions.

As illustrated in FIG. 12, at 1202 one or more of the servers in a layer (N) of local servers in the local network partition detect failure to connect to servers on another partition.

At 1204, the local servers in the layer of the partition elect a local master. This master goes into local write mode and acts as the authoritative server for the local partition. If the local master fails a new local master is elected. At 1206, peer servers at the same tier in the local partition are temporarily reconfigured to treat the elected master as local master. All write requests are routed to the locally elected proxy using a proxy mechanism such as that discussed above for partitioning. Local servers at same tier temporarily reconfigure to point at the elected local master to pull change logs.

At 1208, the local master saves the updates in its local store and records them in its local write log using a different machine ID to identify the log. At 1210 all changes are replicated to lower tier servers in the same network partition using the processes discussed above with respect to FIG. 5. At 1212, the current local master continues to test ability connect to servers in remote network partition.

When restoration of network connectivity to the missing partition is detected, at 1212, for each resource, the local master processes and sorts its write log to find the most recent update at 1214. To perform this function, a index may be maintained of the log, allowing the local master to find the last write of a resource written while it was the local master. At 1216, a determination is made as to whether the local resource is newer than the remote at 1216. If so, it issues a GET against the local server and PUT against the remote server which updates the normal authoritative store. In another alternative, the log can be read sequentially by reading through the local log starting at the first item it wrote using the new machine ID after being elected as local master. The remote store records this as a normal update and will end up overlaying the local version. If the remote content is newer at 1218, then an error is logged for manual reconciliation at 1220, the local content is copied to a new numbered resource name, and the new name is added to the error log to allow future reconciliation. The remote content is fetched and overlays the local content at 1222.

Once all files updated at 1224, then at 1226 the local master sets a special resource file which is detected by the local replication servers to shift all peers at the same tier in the local partition to refer to the remote partitions. All servers in the local partition begin processing changes from remote authoritative store starting from a point before the failure occurs. Eventually they are brought fully up to date when they have processed all the changes which occurred while network connectivity has been down.

Alternatively, at 1214, each resource on the local server may be processed if the total number of changes in the local log with the new machine ID is greater than some threshold (either an absolute threshold or a percentage of total resources on the server, for example).

Some data, for example banking transactions, does not allow the possibility of conflicting changes. To support this, servers can be able to analyze the local path and not accept changes for data having strict consistency requirements. If data in the files can be updated at a finer granularity, such as at the atomic data element in a XML, structure, then the process may be applied at a finer granularity.

Some consistency issues can be overcome by using the versioned numbered files identified above. If each version of each file is retained then it is possible to write automated or manual processes which can be used to reconcile the content across versions to derive a valid master version.

FIG. 13 is a high-tier diagram of the computing system which can be used to implement any of the computing devices discussed herein. The computing system of FIG. 13 includes processor 1300, memory 1302, mass storage device 1304, peripherals 1306, output devices 1308, input devices 1310, portable storage 1312, and display system 1314. For purposes of simplicity, the components shown in FIG. 13 are depicted as being connected via single bus 1320. However, the components may be connected through one or more data transport means. In one alternative, processor 1300 and memory 1302 may be connected via a local microprocessor bus, and the mass storage device 1304, peripheral device 1306, portable storage 1312 and display system 1314 may be connected via one or more input/output buses.

Processor 1300 may contain a single microprocessor, or may contain a plurality of microprocessors for configuring the computer system as a multiprocessor system. Memory 1302 stores instructions and data for execution by processor 1300. If the technology described herein is wholly or partially implemented in software, memory 1302 (which may include one or more memory devices) will store the executable code for programming processor 1300 to perform the processes described herein. In one embodiment, memory 1302 may include banks of dynamic random access memory, high speed cache memory, flash memory, other nonvolatile memory, and/or other storage elements.

Mass storage device 1304, which may be implemented with a magnetic disc drive or optical disc drive, is a nonvolatile storage device for storing data and code. In one embodiment, mass storage device 1304 stores the system software that programs processor 1300 to implement the technology described herein.

Portable storage device 1312 operates in conjunction with a portable nonvolatile storage medium, such as a floppy disc, CD-RW, flash memory card/drive, etc., to input and output data and code to and from the computing system of FIG. 13. In one embodiment, system software for implementing the present technology is stored on such a portable medium, and is input to the computer system via portable storage medium drive 1312.

Peripheral devices 1306 may include any type of computer support device, such as an input/output interface, to add additional functionality to the computer system. For example, peripheral devices 1306 may include a network interface for connecting the computer system to a network, a modem, a router, a wireless communication device, etc. Input devices 1310 provide a portion of a user interlace, and may include a keyboard or pointing device (e.g. mouse, track ball, etc.). In order to display textual and graphical information, the computing system of FIG. 13 will (optionally) have an output display system 1314, which may include a video card and monitor. Output devices 1308 can include speakers, printers, network interfaces, etc.

The components depicted in the computing system of FIG. 13 are those typically found in computing systems suitable for use with the technology described herein, and are intended to represent a broad category of such computer components that are well known in the art. Many different bus configurations, network platforms, operating systems can be used. The technology described herein is not limited to any particular computing system.

Numerous variations on the above technology are possible. Non file based stores can be updated using the same replication strategy. In this instance, the data source can be modified to provide the update logs and the individual data records can be made available via HTTP GET at unique URI.

The sync client 370 can be easily modified to update a local database in lieu of local files. It is equally viable to store the elements retrieved from a remote database as local files. In general, small static files can be served quickly and inexpensively from standard caching HTTP servers, delivering overall cost benefit while requiring minimum of investment to move data resources forward for high speed access.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method for managing a resource delivery network including a plurality of tiers, comprising:
under control of one or more computer systems configured with executable instructions,
reading, by a first server associated with a first data store, first write data of a second server in a tier of the resource delivery network, the first write data identi- fying one or more writes to a second data store associated with the second server;

obtaining, by the first server, one or more first resources identified in the first write data;

storing the one or more first resources to the first data store;

comparing the one or more first resources to one or more second resources of a third server in a preceding tier of the resource delivery network;

determining that at least one of the second resources is not included among the one or more first resources;

obtaining, by the first server, the at least one of the second resources;

storing the at least one of the second resources to the first data store; and adding the first server to the tier.

2. The computer-implemented method of claim 1, wherein:

the resource delivery network is organized according to a plurality of partitions, a partition including a subset of a plurality of servers in a tier of the plurality of tiers; and at least one partition is dedicated to distribution of a subset of the resources of an authoritative data store, the subset of the resources corresponding to at least one of a specified size, a specified data type, or a specified set of users.

3. The computer-implemented method of claim 2, wherein the one or more first resources correspond to the at least one of the specified size, the specified data type, or the specified set of users.

4. The computer-implemented method of claim 1, wherein a respective number of servers of each tier of the plurality of tiers is determined based at least in part upon maintaining maximum write performance of a plurality of servers of a preceding tier at a specified threshold when the plurality of servers of the tier concurrently read at a specified throttle rate from the plurality of servers of the preceding tier.

5. The computer-implemented method of claim 1, further comprising:

obtaining, by the first server, a configuration file including a mapping of the first server to a cluster and a network address for obtaining configuration data for the cluster; and obtaining, by the first server, the configuration data using the network address.

6. The computer-implemented method of claim 5, further comprising:

filtering out at least one of the one or more resources based at least in part upon the configuration data.

7. The computer-implemented method of claim 1, wherein comparing the one or more first resources to the one or more second resources includes:

comparing the first write data to second write data of the third server, the second write data identifying one or more writes to a third data store associated with the third server.

8. The computer-implemented method of claim 7, wherein the second write data includes at least one delete operation of at least one of the second resources, and the method further comprises:

deleting, by the first server, the at least one of the second resources from the first data store.

9. A resource delivery network including a plurality of tiers, comprising:

at least one processor;

memory including instructions that, upon being executed by the at least one processor, cause the resource delivery network to:

read, by a first server associated with a first data store, first write data of a second server in a tier of the resource delivery network, the first write data identifying one or more writes to a second data store associated with the second server;

obtain, by the first server, one or more first resources identified in the first write data;

store the one or more first resources to the first data store;

compare the one or more first resources to one or more second resources of a third server in a preceding tier of the resource delivery network;

determine that at least one of the second resources is not included among the one or more first resources;

obtain, by the first server, the at least one of the second resources;

store the at least one of the second resources to the first data store; and add the first server to the tier.

10. The resource delivery network of claim 9, wherein:

the resource delivery network is organized according to a plurality of partitions, a partition including a subset of a plurality of servers in a tier of the plurality of tiers; and at least one partition is dedicated to distribution of a subset of the resources of an authoritative data store, the subset of the resources corresponding to at least one of a specified size, a specified data type, or a specified set of users.

11. The resource delivery network of claim 10, wherein the one or more first resources correspond to the at least one of the specified size, the specified data type, or the specified set of users.

12. The resource delivery network of claim 9, wherein a respective number of servers of each tier of the plurality of tiers is determined based at least in part upon maintaining maximum write performance of a plurality of servers of a preceding tier at a specified threshold when the plurality of servers of the tier concurrently read at a specified throttle rate from the plurality of servers of the preceding tier.

13. The resource delivery network of claim 9, wherein the instructions upon being executed further cause the resource delivery network to:

obtain, by the first server, a configuration file including a mapping of the first server to a cluster and a network address for obtaining configuration data for the cluster; and obtain, by the first server, the configuration data using the network address.

14. The resource delivery network of claim 13, wherein the instructions upon being executed further cause the resource delivery network to:

filter out at least one of the one or more resources based at least in part upon the configuration data.

15. The resource delivery network of claim 9, wherein the instructions that cause the resource delivery network to compare the one or more first resources to the one or more resources include causing the resource delivery network to:

compare the first write data to second write data of the third server, the second write data identifying one or more writes to a third data store associated with the third server.

16. The resource delivery network of claim 15, wherein the second write data includes at least one delete operation of at least one of the second resources, and the instructions upon being executed further cause the resource delivery network to:

delete, by the first server, the at least one of the second resources from the first data store.

* * * * *